(12) United States Patent
Kim et al.

(10) Patent No.: US 12,105,564 B2
(45) Date of Patent: Oct. 1, 2024

(54) DISPLAY DEVICE

(71) Applicant: SAMSUNG DISPLAY CO., LTD., Yongin-si (KR)

(72) Inventors: Dawoon Kim, Yongin-si (KR); Kyungman Kim, Anyang-si (KR); Sanghoon Kim, Hwaseong-si (KR); Sunghoon Kim, Asan-si (KR); Seungho Kim, Asan-si (KR); Yuri Kim, Guri-si (KR); Min-Hoon Choi, Seoul (KR); Seongjin Hwang, Suwon-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 78 days.

(21) Appl. No.: 17/961,082

(22) Filed: Oct. 6, 2022

(65) Prior Publication Data

US 2023/0195177 A1    Jun. 22, 2023

(30) Foreign Application Priority Data

Dec. 20, 2021    (KR) .......................... 10-2021-0182820

(51) Int. Cl.
G06F 1/16    (2006.01)

(52) U.S. Cl.
CPC .......... *G06F 1/1681* (2013.01); *G06F 1/1641* (2013.01); *G06F 1/1652* (2013.01)

(58) Field of Classification Search
CPC .... G06F 1/1681; G06F 1/1641; G06F 1/1652; Y02E 10/549; G09F 9/301; G09F 9/33; H10K 50/841; H10K 77/111; H10K 2102/311
See application file for complete search history.

(56) References Cited

U.S. PATENT DOCUMENTS

| | | | |
|---|---|---|---|
| 9,964,995 B1 | 5/2018 | Morrison et al. | |
| 10,600,989 B1* | 3/2020 | Ai | H10K 59/871 |
| 10,936,012 B2* | 3/2021 | Kim | G02F 1/133308 |
| 11,320,866 B2* | 5/2022 | Sunwoo | G06F 1/1641 |
| 11,627,679 B2* | 4/2023 | Sunwoo | C03C 17/32 |
| | | | 428/163 |
| 2020/0341513 A1* | 10/2020 | Kim | B32B 27/281 |
| 2021/0118337 A1* | 4/2021 | Park | G09F 9/301 |
| 2022/0225523 A1* | 7/2022 | Nguyen | H10K 77/111 |
| 2022/0309964 A1* | 9/2022 | Wang | G06F 1/1616 |

FOREIGN PATENT DOCUMENTS

| KR | 10-2014-0015881 | 2/2014 |
|---|---|---|
| KR | 10-2019-0124844 | 11/2019 |
| KR | 10-2020-0069799 | 6/2020 |

* cited by examiner

*Primary Examiner* — Rockshana D Chowdhury
(74) *Attorney, Agent, or Firm* — F. CHAU & ASSOCIATES, LLC

(57) ABSTRACT

A display device including: a display module including a display folding portion and a display curved portion adjacent to the display folding portion, wherein the display curved portion has a curvature when the display folding portion is folded; and a window disposed on the display module, the window including a first surface and a second surface opposite to the first surface, and having first grooves overlapping the display folding portion and second grooves overlapping the display curved portion, wherein the first grooves are formed in the first surface of the window and the second grooves are formed in the second surface of the window.

17 Claims, 18 Drawing Sheets

DISPLAY DEVICE

This application claims priority under 35 U.S.C. § 119 to Korean Patent Application No. 10-2021-0182820, filed on Dec. 20, 2021, the disclosure of which is incorporated by reference herein in its entirety.

TECHNICAL FIELD

Embodiments of the inventive concept relate generally to a display device. Specifically, embodiments of the inventive concept relate a flexible display device.

DISCUSSION OF THE RELATED ART

A flat panel display (e.g., an organic light emitting diode display) has properties such as light weight and thin thickness. Recently, the development of flexible display devices is increasing. There exists a variety of flexible display devices such as a curved display device, a bent display device, a foldable display device, a rollable display device, a stretchable display device, and the like. The flexible display device is generally configured to include a display module and a window disposed on the display module. If, however, the window is deformed by repeated folding, a stain may be recognized by a user.

SUMMARY

Embodiments of the inventive concept provide a flexible display device.

A display device according to an embodiment of the inventive concept may include: a display module including a display folding portion and a display curved portion adjacent to the display folding portion, wherein the display curved portion has a curvature when the display folding portion is folded; and a window disposed on the display module, the window including a first surface and a second surface opposite to the first surface, and having first grooves overlapping the display folding portion and second grooves overlapping the display curved portion, wherein the first grooves are formed in the first surface of the window and the second grooves are formed in the second surface of the window.

The first surface of the window faces the display module.

The second surface of the window faces the display module.

A width of at least one of the first grooves is smaller than a width of at least one of the second grooves.

The display may further include a support module disposed under the display module and having first holes overlapping the display folding portion and second holes overlapping the display curved portion.

A distance between the first grooves is smaller than a distance between the second grooves.

The display device may further include a resin disposed in the first grooves and the second grooves and covering the window.

A display device according to an embodiment of the inventive concept may include: a display module including a display folding portion, wherein the display folding portion is foldable; and a window disposed on the display module, the window including a first surface facing the display module, a second surface opposite to the first surface, first folding grooves overlapping the display folding portion and second folding grooves overlapping the display folding portion, wherein the first folding grooves are formed in the first surface of the window, and wherein the second folding grooves are formed in the second surface of the window and between the first folding grooves.

The first folding grooves and the second folding grooves do not overlap each other.

A depth of at least one of the first folding grooves is smaller than a half of a thickness of the window, and a depth of at least one of the second folding grooves is smaller than the half of the thickness of the window.

The first folding grooves and the second folding grooves are spaced apart from each other, when viewed in a longitudinal direction of the window.

A depth of at least one of the first folding grooves is greater than a half of a thickness of the window, and a depth of at least one of the second folding grooves is greater than the half of the thickness of the window.

The first folding grooves and the second folding grooves overlap each other, when viewed in a longitudinal direction of the window.

The display module further includes a display curved portion adjacent to the display folding portion, wherein the display curved portion has a curvature when the folding portion is folded, and wherein curved grooves overlapping the display curved portion are formed in the window.

A width of at least one of the first folding grooves is smaller than a width of at least one of the curved grooves, and a width of at least one of the second folding grooves is smaller than the width of at least one of the curved grooves.

The curved grooves include: first curved grooves formed in the first surface of the window; and second curved grooves formed in the second surface of the widow and between the first curved grooves.

The curved grooves are formed in the second surface of the window.

The display device may further include a resin in the first folding grooves and the second folding grooves and covering the window.

A display device according to an embodiment of the inventive concept may include: a display module including a foldable portion and a curved portion adjacent to the foldable portion; a window overlapping the display module, the window including a first recessed portion overlapping the foldable portion and a second recessed portion overlapping the curved portion; and a resin provided in the first and second recessed portions.

The first recessed portion is formed in a first surface of the window and the second recessed portion is formed in a second surface of the window.

Therefore, a display device according to embodiments of the inventive concept may include a window, and the window may include a folding portion that is folded and first and second curved portions whose curvature is formed as the folding portion is folded. First grooves may be formed in the folding portion, and second grooves and third grooves may be formed in the first and second curved portions, respectively. Since the second grooves and the third grooves are formed in surfaces opposite to the first groove, stress applied to the window may be dispersed. In addition, since a first width of each of the first grooves is smaller than a second width of each of the second grooves (or the third grooves), the folding portion may be smoothly folded.

BRIEF DESCRIPTION OF THE DRAWINGS

The accompanying drawings, which are included to provide a further understanding of the inventive concept and are incorporated in and constitute a part of this specification, illustrate embodiments of the inventive concept together with the description.

DETAILED DESCRIPTION OF THE EMBODIMENTS

Illustrative, non-limiting embodiments of the inventive concept will be more clearly understood from the following detailed description in conjunction with the accompanying drawings.

Figure 1:
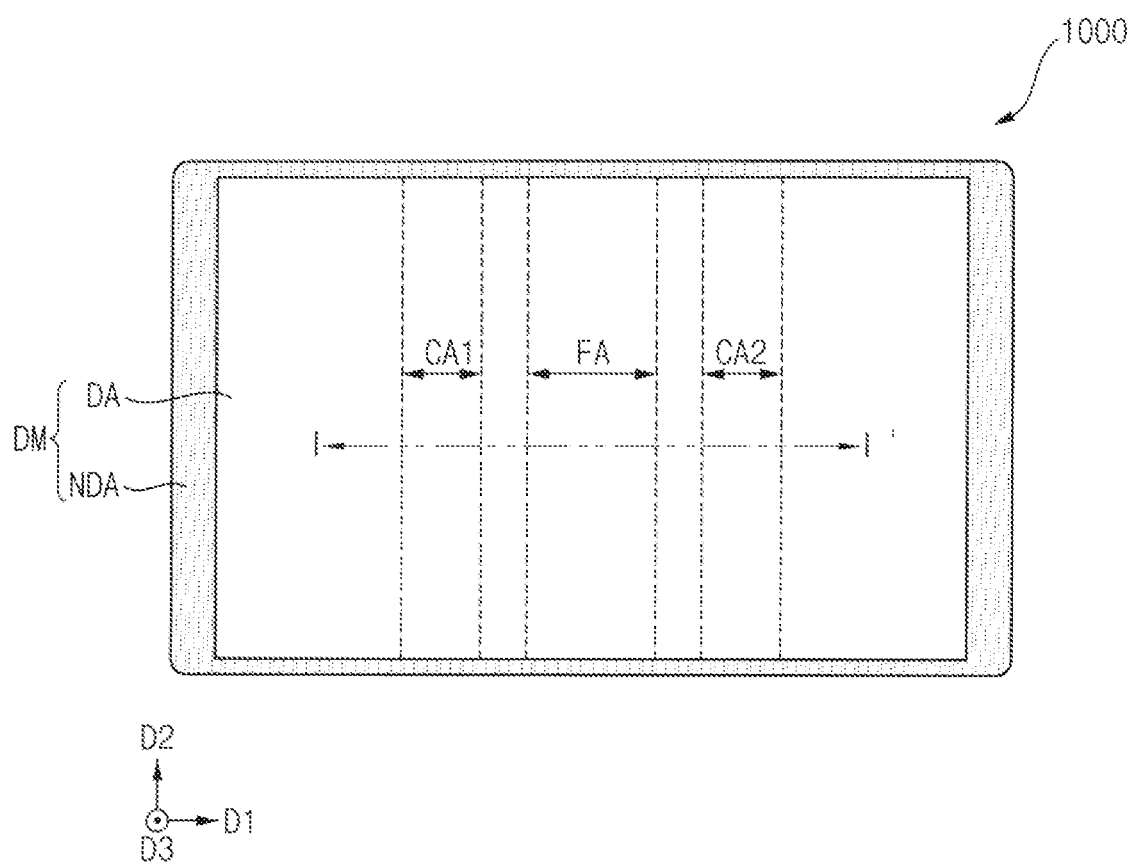
FIG. 1 is a plan view illustrating an unfolded state of a display device according to an embodiment of the inventive concept.
Figure 2:
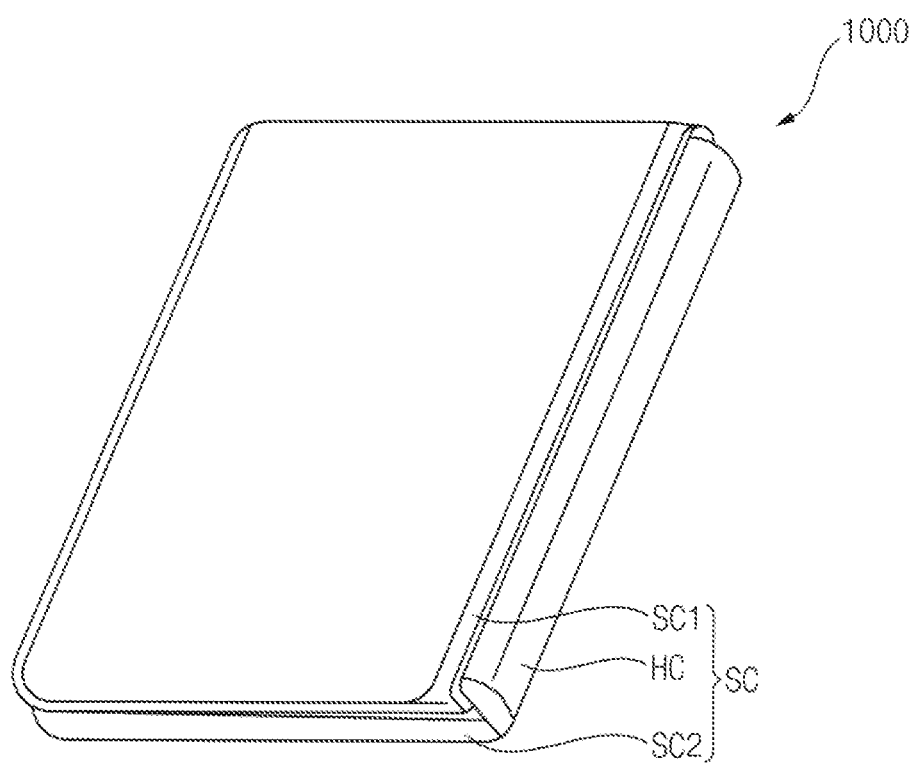
FIG. 2 is a perspective view illustrating a folded state of the display device of FIG. 1.
Figure 3:
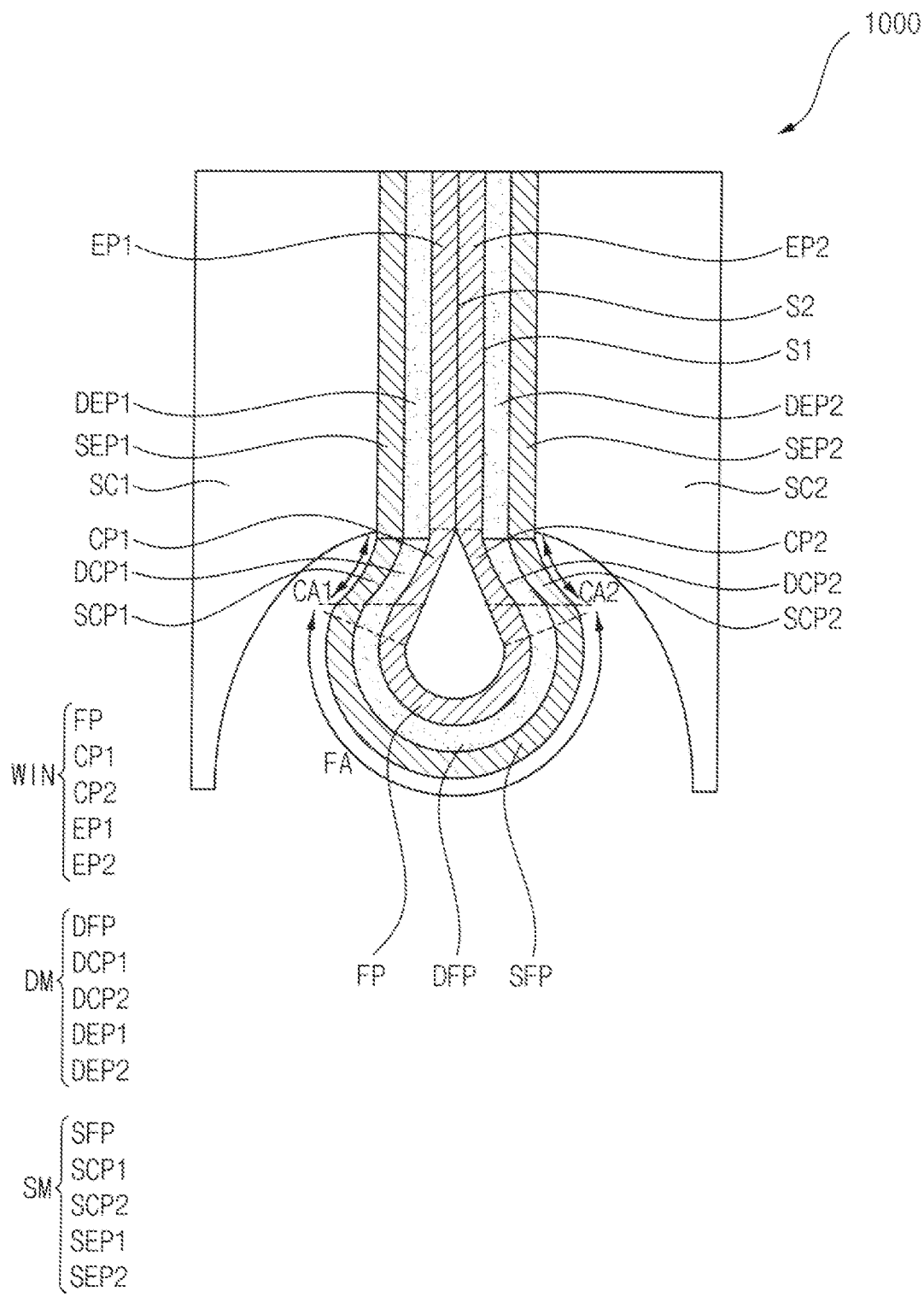
FIG. 3 is a cross-sectional view illustrating a folded state of the display device of FIG. 1.

FIG. 1 is a plan view illustrating an unfolded state of a display device according to an embodiment of the inventive concept. FIG. 2 is a perspective view illustrating a folded state of the display device of FIG. 1. FIG. 3 is a cross-sectional view illustrating a folded state of the display device of FIG. 1.

Referring to FIGS. 1, 2, and 3, a display device 1000 according to an embodiment of the inventive concept may include a display module DM and a set cover SC.

The display module DM may include a display area DA and a non-display area NDA. An image may be displayed in the display area DA, and the non-display area NDA may be disposed to surround the display area DA. The non-display area NDA may have different widths at sides of the display area DA. For example, the non-display area NDA may have a first width at a first pair of opposite sides of the display area DA and a second width at a second pair of opposite sides of the display area DA, the second width being different from the first width. The non-display area NDA may form a bezel of the display device 1000.

In an embodiment of the inventive concept, the display area DA may include a folding area FA, a first curved area CA1, and a second curved area CA2. In other words, an image may be displayed in the folding area FA, the first curved area CA1, and the second curved area CA2. The first curved area CA1 and the second curved area CA2 may be adjacent to the folding area FA. The folding area FA may be positioned between the first curved area CA1 and the second curved area CA2. The folding area FA may be folded. As the folding area FA is folded, curvatures may be formed in the first curved area CA1 and the second curved area CA2.

The display module DM may repeatedly perform folding and unfolding. In other words, the display module DM may be repeatedly folded and unfolded. In an embodiment of the inventive concept, the display module DM may include a flexible substrate (e.g., a plastic substrate). As shown in FIG. 1, when the display module DM is unfolded by an external force applied by a user, the display area DA may be exposed. In addition, as shown in FIG. 2, the display module DM may be folded by an external force applied by a user. In this case, the majority of the display area DA may be not visible to the user.

The set cover SC may include a first set cover SC1, a second set cover SC2, and a hinge cover HC. The first set cover SC1 and the second set cover SC2 may be coupled to each other by the hinge cover HC. The display device 1000 may be folded or unfolded about the hinge cover HC. The first set cover SC1 may support a first display flat portion DEP1 of the display module DM. The second set cover SC2 may support a second display flat portion DEP2 of the display module DM.

When the display device 1000 is folded, the display module DM may be folded such that the first display flat portion DEP1 and the second display flat portion DEP2 face each other. For example, when an external force is applied by a user to the display device 1000 in an unfolded state, the first set cover SC1 may rotate in a clockwise direction, and the second set cover SC2 may rotate in a counterclockwise direction.

Figure 4:
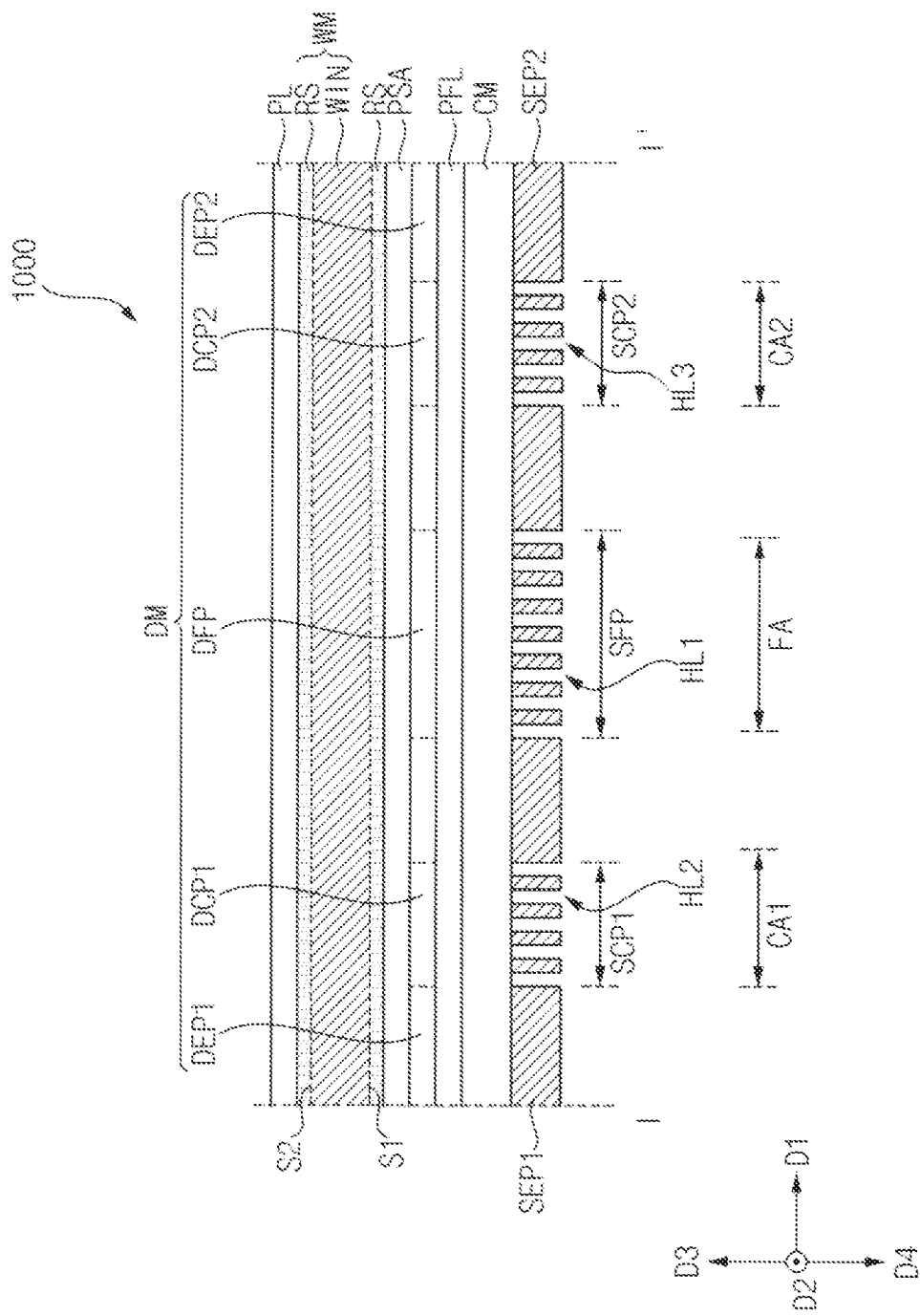
FIG. 4 is a cross-sectional view illustrating an unfolded state of the display device of FIG. 1.

FIG. 4 is a cross-sectional view illustrating an unfolded state of the display device of FIG. 1.

Referring to FIGS. 3 and 4, the display device 1000 may include a support module SM, a buffer member CM, a protective film PFL, the display module DM, an adhesive layer PSA, a window module WM, and a protective layer PL.

The support module SM may be disposed under the display module DM and may support the display module DM. In an embodiment of the inventive concept, the support module SM may be formed of metal. For example, the support module SM may include at least one of invar, which is an alloy of nickel ("Ni") and iron ("Fe"), stainless steel ("SUS"), titanium ("Ti"), and copper ("Cu"). These may be used alone or in combination with each other. In another embodiment of the inventive concept, the support module SM may be formed of a non-metal. In addition, the support module SM may be formed by mixing a metal and a non-metal.

In an embodiment of the inventive concept, the support module SM may include a support folding portion SFP, a first support curved portion SCP1, a second support curved portion SCP2, a first support flat portion SEP1, and a second support flat portion SEP2.

The support folding portion SFP may overlap the folding area FA. A plurality of first holes HL1 may be formed in the support folding portion SFP. The first holes HL1 may pass through the support module SM in a thickness direction (e.g., a third direction D3) of the support module SM. Since the first holes HL1 pass through the support module SM, the support module SM may be smoothly folded.

The first support curved portion SCP1 and the second support curved portion SCP2 may be adjacent to the supporting folding portion SFP. When the support folding portion SFP is folded, curvatures may be formed in the first support curved portion SCP1 and the second support curved portion SCP2.

The first support curved portion SCP1 may overlap the first curved area CA1. A plurality of second holes HL2 may be formed in the first support curved portion SCP1. The second holes HL2 may pass through the support module SM in the third direction D3. Since the second holes HL2 pass through the support module SM, the support module SM may be smoothly curved. In other words, the support module SM may form a smooth curve due to the second holes HL2.

The second support curved portion SCP2 may overlap the second curved area CA2. A plurality of third holes HL3 may be formed in the second support curved portion SCP2. The third holes HL3 may pass through the support module SM in the third direction D3. Since the third holes HL3 pass through the support module SM, the support module SM may be smoothly curved. In other words, the support module SM may form a smooth curve due to the third holes HL3.

In another embodiment of the inventive concept, the second holes HL2 and the third holes HL3 may not pass through the support module SM. For example, the second holes HL2 and the third holes HL3 may etch the support module SM by about a half of the support module SM in a thickness direction of the support module SM. In other words, the second and third holes HL2 and HL3 may be formed such that they do not expose the buffer member CM.

The buffer member CM may be disposed between the support module SM and the display module DM. The buffer member CM may buffer an external shock that may be applied to the display module DM and may protect the display module DM. For example, the buffer member CM may include a material capable of buffering by containing air, such as a cushion or a sponge. In addition, to facilitate folding and unfolding of the display module DM, the buffer member CM may include a flexible material. For example, the buffer member CM may include polyacrylates resin, polyurethane, thermoplastic thermoplastic polyurethane ("TPU"), latex, polyurethane foam, polystyrene foam, and the like. These may be used alone or in combination with each other.

The protective film PFL may be disposed between the buffer member CM and the display module DM. The protective film PFL may prevent penetration of moisture and oxygen from the outside and absorb external impact. To realize a flexible display device, the display module DM may include a flexible plastic substrate, and the protective film PFL may support the plastic substrate.

For example, the protective film PFL may be a plastic film. For example, the protective film PFL may include polyethersulfone ("PS"), polyacrylate ("PAR"), polyetherimide ("PEI"), polyethylenenaphthalate ("PEN"), polyphenylene sulfide ("PPS"), polyarylate ("PA"), polycarbonate ("PC"), poly(arylene ethersulfone), polyethylene terephthalate ("PET"), polyimide ("PI") and the like. These may be used alone or in combination with each other.

The display module DM may be disposed between the protective film PFL and the window module WM.

In an embodiment of the inventive concept, the display module DM may include a display folding portion DFP, a first display curved portion DCP1, a second display curved portion DCP2, the first display flat portion DEP1, and the second display flat portion DEP2.

The display folding portion DFP may overlap the folding area FA. The display folding portion DFP may be folded by an external force applied by a user.

The first display curved portion DCP1 and the second display curved portion DCP2 may be adjacent to the display folding portion DFP. As the display folding portion DFP is folded, a curvature may be formed in each of the first display curved portion DCP1 and the second display curved portion DCP2.

The first display curved portion DCP1 may overlap the first curved area CA1. The second display curved portion DCP2 may overlap the second curved area CA2.

As the display folding portion DFP is folded and curvatures are formed in the first and second display curved portions DCP1 and DCP2, the display device 1000 may be folded in a dumbbell shape.

An image may be displayed in the display folding portion DFP, the first display curved portion DCP1, the second display curved portion DCP2, the first display flat portion DEP1, and the second display flat portion DEP2. A detailed structure of the display module DM will be described with reference to FIG. 6.

The adhesive layer PSA may be disposed on the display module DM. The adhesive layer PSA may adhere the window module WM to the display module DM. In an embodiment of the inventive concept, the adhesive layer PSA may include a pressure sensitive adhesive (PSA), an optically clear adhesive (OCA), an optically clear resin (OCR), or the like. These may be used alone or in combination with each other.

The window module WM may be disposed on the adhesive layer PSA. The window module WM may buffer an external shock that may be applied to the display module DM, and may protect the display module DM.

In an embodiment of the inventive concept, the window module WM may include a window WIN and a resin RS.

The window WIN may include a first surface S1 and a second surface S2. The first surface S1 may face the display module DM. The second surface S2 may be opposite to the first surface S1. At least one groove may be formed in the first surface S1 and/or the second surface S2 of the window WIN. Accordingly, the window WIN may be smoothly folded and may be smoothly curved.

In an embodiment of the inventive concept, the window WIN may be glass or ultra thin glass (UTG). Examples of materials that can be used as the glass include soda lime glass, alkali alumina silicate glass, borosilicate glass, lithium alumina silicate glass, and the like. These may be used alone or in combination with each other.

In an embodiment of the inventive concept, the window WIN may be made of plastic. Examples of materials that can be used as the plastic may include polyimide ("PI"), polyacrylate, polymethylmethacrylate ("PMMA"), polycarbonate ("PC"), polyethylenenaphthalate ("PEN"), polyvinylidene chloride, polyvinylidene difluoride ("PVDF"), polystyrene, ethylene vinylalcohol copolymer, polyethersulphone ("PES"), poly etherimide ("PEI"), polyphenylene sulfide ("PPS"), polyallylate, tri-acetyl cellulose ("TAC"), cellulose acetate propionate ("CAP"), and so on. These may be used alone or in combination with each other.

When the window WIN is formed of glass, although the impact resistance is excellent, the flexible property is weakened. However, grooves to be described later may be formed in the window WIN of the display device 1000 according to an embodiment of the present invention. Accordingly, when the display device 1000 is folded, stress applied to the window WIN may be dispersed. Accordingly, even when the window WIN is formed of the glass, the window WIN may be sufficiently flexible. Accordingly, the window WIN formed of the glass may have flexible characteristics and excellent impact resistance at the same time.

The resin RS may cover the window WIN. For example, the resin RS may be disposed between the window WIN and the adhesive layer PSA and disposed on the window WIN. In other words, the resin RS may be disposed on a lower portion of the first surface S1 and an upper portion of the second surface S2. In an embodiment of the inventive concept, the resin RS may include a flexible polymer material and/or an adhesive. Accordingly, the window module WM may be smoothly folded and may be smoothly curved.

The protective layer PL may be disposed on the window module WM. The protective layer PL may be a plastic film. For example, the protective layer PL may include polyethersulfone ("PS"), polyacrylate ("PAR"), polyetherimide ("PEI"), polyethylenenaphthalate ("PEN"), polyphenylene sulfide ("PPS"), polyarylate ("PA"), polycarbonate ("PC"), poly(arylene ethersulfone), polyethylene terephthalate ("PET"), polyimide ("PI"), and the like. These may be used alone or in combination with each other.

Figure 5:
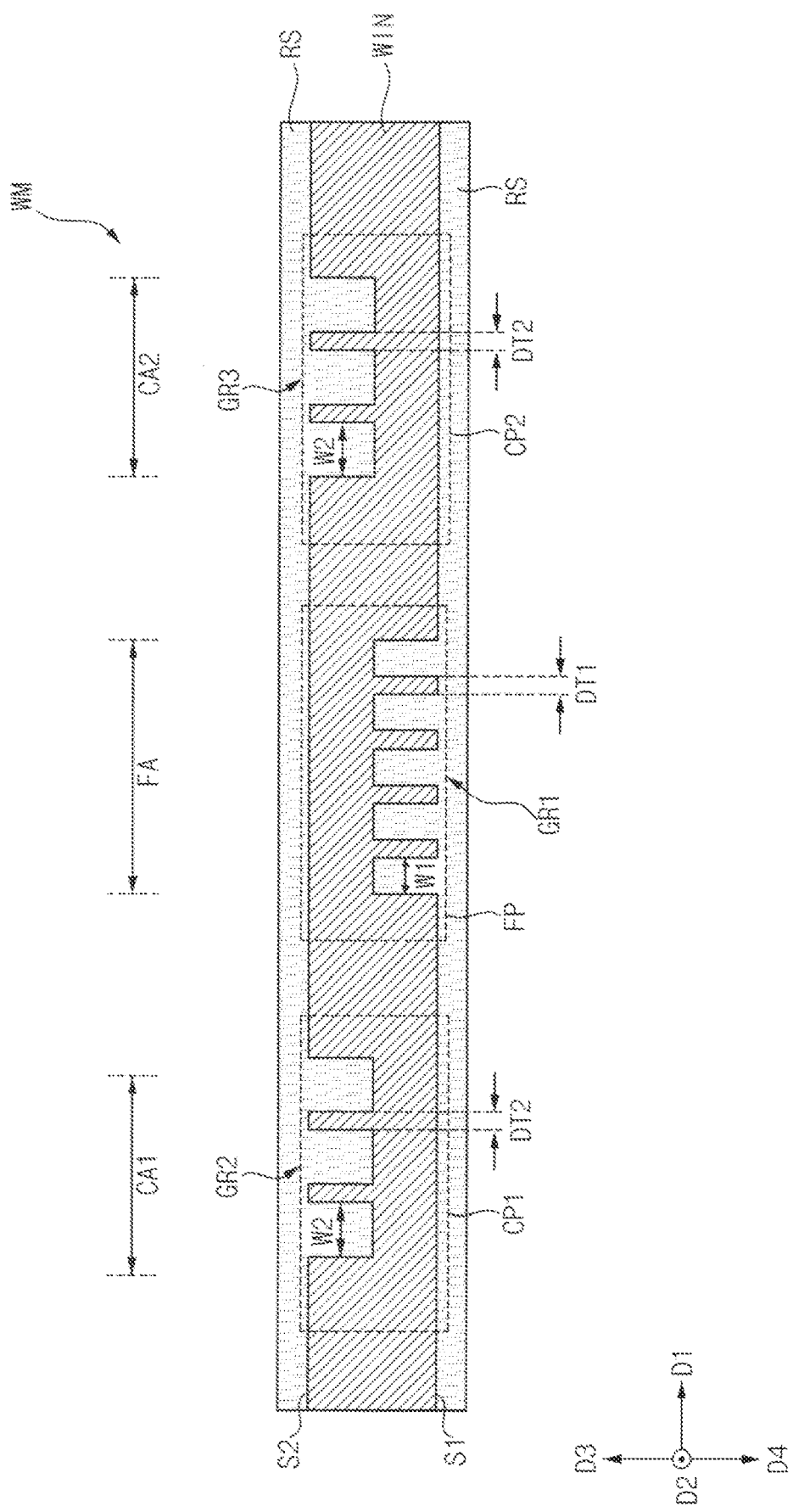
FIG. 5 is a cross-sectional view illustrating a window module included in the display device of FIG. 4.

FIG. 5 is a cross-sectional view illustrating a window module included in the display device of FIG. 4.

Referring to FIGS. 3, 4, and 5, the window module WM may include the window WIN and the resin RS.

In an embodiment of the inventive concept, the window WIN may include a folding portion FP, a first curved portion CP1, a second curved portion CP2, a first flat portion EP1, and a second flat portion EP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed by etching the window WIN at regular intervals. The first grooves GR1 may be formed in the first surface S1 and may extend in the third direction D3 (e.g., a direction from the first surface S1 to the second surface S2). Accordingly, a concave-convex shape may be formed in the first surface S1 of the window WIN.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed by etching the window WIN at regular intervals. The second grooves GR2 may be formed in the second surface S2 and may be formed in a fourth direction D4 opposite to the third direction D3 (e.g., a direction from the second surface S2 to the first surface S1). Accordingly, a concave-convex shape may be formed in the second surface S2 of the window WIN.

In an embodiment of the inventive concept, the second curved portion CP2 may overlap the second curved area CA2. As the folding portion FP is folded, a curvature may be formed in the second curved part CP2. Third grooves GR3 may be formed in the second curved portion CP2. In other words, the third grooves GR3 may overlap the second curved area CA2.

In an embodiment of the inventive concept, the third grooves GR3 may be formed by etching the window WIN at regular intervals. The third grooves GR3 may be formed on the second surface S2 and may extend in the fourth direction D4. Accordingly, a concave-convex shape may be formed in the second surface S2 of the window WIN.

In an embodiment of the inventive concept, the shape of the first curved portion CP1 may be substantially the same as the shape of the second curved portion CP2.

In the display device 1000, since the second and third grooves GR2 and GR3 are formed in surfaces opposite to the first groove GR1, the stress applied to the window WIN may be dispersed.

In an embodiment of the inventive concept, a first width W1 of each of the first grooves GR1 may be smaller than a second width W2 of each of the second grooves GR2. For example, the first width W1 may be a length in which each of the first grooves GR1 extends in a first direction D1 (e.g., X direction) perpendicular to the third direction D3. In addition, the second width W2 may be the same as a width of each of the third grooves GR3. In the alternative, the width of each of the third grooves GR3 may be different from the width of each of the second grooves GR2.

In an embodiment of the inventive concept, a first distance DT1 between the first grooves GR1 may be smaller than a second distance DT2 between the second grooves GR2. For example, the first distance DT1 may be a distance at which the first grooves GR1 are spaced apart from each other in the first direction D1. In addition, the second distance DT2 may be the same as a distance between the third grooves GR3. In the alternative, the second distance DT2 may be different from the distance between the third grooves GR3.

In the display device 1000, since the first width W1 and the first distance DT1 are formed to be relatively small, the folding portion FP may be smoothly folded. In addition, since the second width W2 and the second distance DT2 are formed to be relatively large, the first and second curved portions CP1 and CP2 may have excellent impact resistance.

In an embodiment of the inventive concept, the resin RS may fill the first grooves GR1, the second grooves GR2, and the third grooves GR3, and may cover the window WIN.

In an embodiment of the inventive concept, the first grooves GR1, the second grooves GR2, and the third grooves GR3 may be formed through an etching process. For example, a laser may be irradiated to the folding portion FP, the first curved portion CP1, and the second curved portion CP2. A region to which the laser is irradiated has a change in modification, and thus may have a different etch selectivity from a region to which the laser is not irradiated. Thereafter, the region irradiated with the laser is etched through a dry etching process, a wet etching process, etc., so that the first grooves GR1, the second grooves GR2, and the third grooves GR3 may be formed.

A display device 1000 according to an embodiment of the inventive concept may include: a display module DM including a display folding portion DFP and a display curved portion DCP1/DCP2 adjacent to the display folding portion DFP, wherein the display curved portion DCP1/DCP2 has a curvature when the display folding portion DFP is folded; and a window WIN disposed on the display module DM, the window WIN including a first surface S1 and a second surface S2 opposite to the first surface S1, and having first grooves GR1 overlapping the display folding portion DFP and second grooves GR2/GR3 overlapping the display curved portion DCP1/DCP2, wherein the first grooves GR1 are formed in the first surface S1 of the window WIN and the second grooves GR2/GR3 are formed in the second surface S2 of the window WIN.

Figure 6:
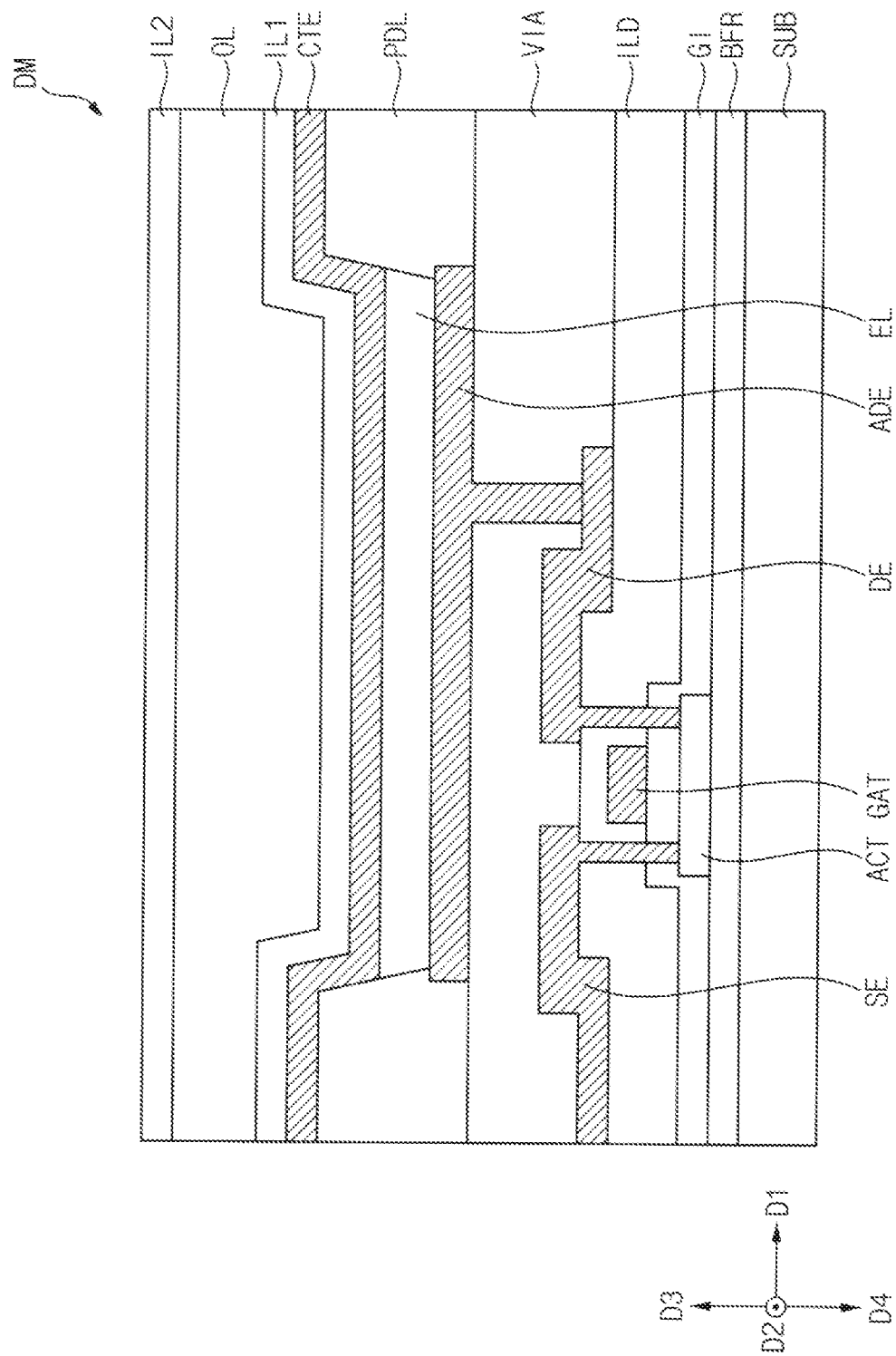
FIG. 6 is a cross-sectional view illustrating a display module included in the display device of FIG. 4.

FIG. 6 is a cross-sectional view illustrating a display module included in the display device of FIG. 4.

Referring to FIG. 6, the display module DM may include a substrate SUB, a buffer layer BFR, an active pattern ACT, a gate insulating layer GI, a gate electrode GAT, an interlayer insulating layer ILD, a source electrode SE, a drain electrode DE, a via insulating layer VIA, a first electrode ADE, a pixel defining layer PDL, an emission layer EL, a second electrode CTE, a first inorganic layer IL1, an organic layer OL, and a second inorganic layer IL2.

The substrate SUB may include a transparent or opaque material. In an embodiment of the inventive concept, examples of the material that can be used as the substrate SUB may include glass, quartz, plastic, or the like. These may be used alone or in combination with each other. In addition, the substrate SUB may be configured as a single layer or as a multilayer in combination with each other.

The buffer layer BFR may be disposed on the substrate SUB. The buffer layer BFR may prevent metal atoms, atoms, or impurities from diffusing from the substrate SUB into the active pattern ACT. In addition, the buffer layer BFR may control a heat supply rate during a crystallization process for forming the active pattern ACT.

The active pattern ACT may be disposed on the buffer layer BFR. The active pattern ACT may be formed of a silicon semiconductor material or an oxide semiconductor material. Examples of the silicon semiconductor material that may be used as the active pattern ACT may include amorphous silicon, polycrystalline silicon, or the like. Examples of the oxide semiconductor material that may be used as the active pattern ACT may include IGZO (InGaZnO), ITZO (InSnZnO), and the like. In addition, the oxide semiconductor material may further include indium ("In"), gallium ("Ga"), tin ("Sn"), zirconium ("Zr"), vanadium ("V"), hafnium ("Hf"), cadmium ("Cd"), germanium ("Ge"), chromium ("Cr"), titanium ("Ti"), and zinc ("Zn"). These may be used alone or in combination with each other.

The gate insulating layer GI may be disposed on the active pattern ACT and may cover the active pattern ACT. In an embodiment of the inventive concept, the gate insulating layer GI may be formed of an insulating material. Examples of the insulating material that can be used as the gate insulating layer GI may include silicon oxide, silicon nitride, silicon oxynitride, and the like. These may be used alone or in combination with each other.

The gate electrode GAT may be disposed on the gate insulating layer GI and may overlap the active pattern ACT. In an embodiment of the inventive concept, the gate electrode GAT may be formed of a metal, an alloy, a conductive metal oxide, a transparent conductive material, or the like.

Examples of the material that can be used as the gate electrode GAT may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), tantalum ("Ta"), platinum ("Pt"), scandium ("Sc"), indium tin oxide ("ITO"), indium zinc oxide ("IZO"), and the like. These may be used alone or in combination with each other. In addition, the gate electrode GAT may be configured as a single layer or as a multilayer in combination with each other.

The interlayer insulating layer ILD may be disposed on the gate electrode GAT and may cover the gate electrode GAT. In an embodiment of the inventive concept, the interlayer insulating layer ILD may be formed of an insulating material. Examples of the insulating material that can be used as the interlayer insulating layer ILD may include silicon oxide, silicon nitride, silicon oxynitride, and the like. These may be used alone or in combination with each other. In addition, the interlayer insulating layer ILD may be configured as a single layer or as a multilayer in combination with each other.

The source electrode SE and the drain electrode DE may be disposed on the interlayer insulating layer ILD. Each of the source electrode SE and the drain electrode DE may contact the active pattern ACT. For example, the source electrode SE and the drain electrode DE may contact the active pattern ACT through contact holes in the interlayer insulating layer ILD. In an embodiment of the inventive concept, the source electrode SE and the drain electrode DE may be formed of a metal, an alloy, a conductive metal oxide, a transparent conductive material, or the like.

The via insulating layer VIA may be disposed on the source electrode SE and the drain electrode DE, and may cover the source electrode SE and the drain electrode DE. The via insulating layer VIA may be formed of an insulating material. Examples of the insulating material that may be used as the via insulating layer VIA may include photoresist, polyacrylic resin, polyimide resin, acrylic resin, and the like. These may be used alone or in combination with each other.

The first electrode ADE may be disposed on the via insulating layer VIA. In an embodiment of the inventive concept, the first electrode ADE may be electrically connected to the drain electrode DE. For example, the first electrode ADE may be electrically connected to the drain electrode DE by way of a contact hole formed in the via insulating layer VIA. The first electrode ADE may be formed of a metal, an alloy, a conductive metal oxide, a transparent conductive material, or the like.

The pixel defining layer PDL may be disposed on the via insulating layer VIA, and an opening exposing the first electrode ADE may be formed in the pixel defining layer PDL. The pixel defining layer PDL may be formed of an insulating material. Examples of the insulating material that can be used as the pixel defining layer PDL may include photoresist, polyacrylic resin, polyimide resin, acrylic resin, and the like. These may be used alone or in combination with each other.

The emission layer EL may be disposed on the first electrode ADE. For example, the emission layer EL may be disposed in the opening. The emission layer EL may generate light based on a potential difference between the first electrode ADE and the second electrode CTE.

The second electrode CTE may be disposed on the emission layer EL. The second electrode CTE may be a plate electrode, and may be formed of a metal, an alloy, a conductive metal oxide, a transparent conductive material, or the like.

The first inorganic layer IL1 may be disposed on the second electrode CTE and may be formed of an inorganic material. The organic layer OL may be disposed on the first inorganic layer IL1 and may be formed of an organic material. The second inorganic layer IL2 may be disposed on the organic layer OL and may be formed of an inorganic material. The first inorganic layer IL1, the organic layer OL, and the second inorganic layer IL2 may prevent foreign substances from penetrating into the emission layer EL.

Figure 7:
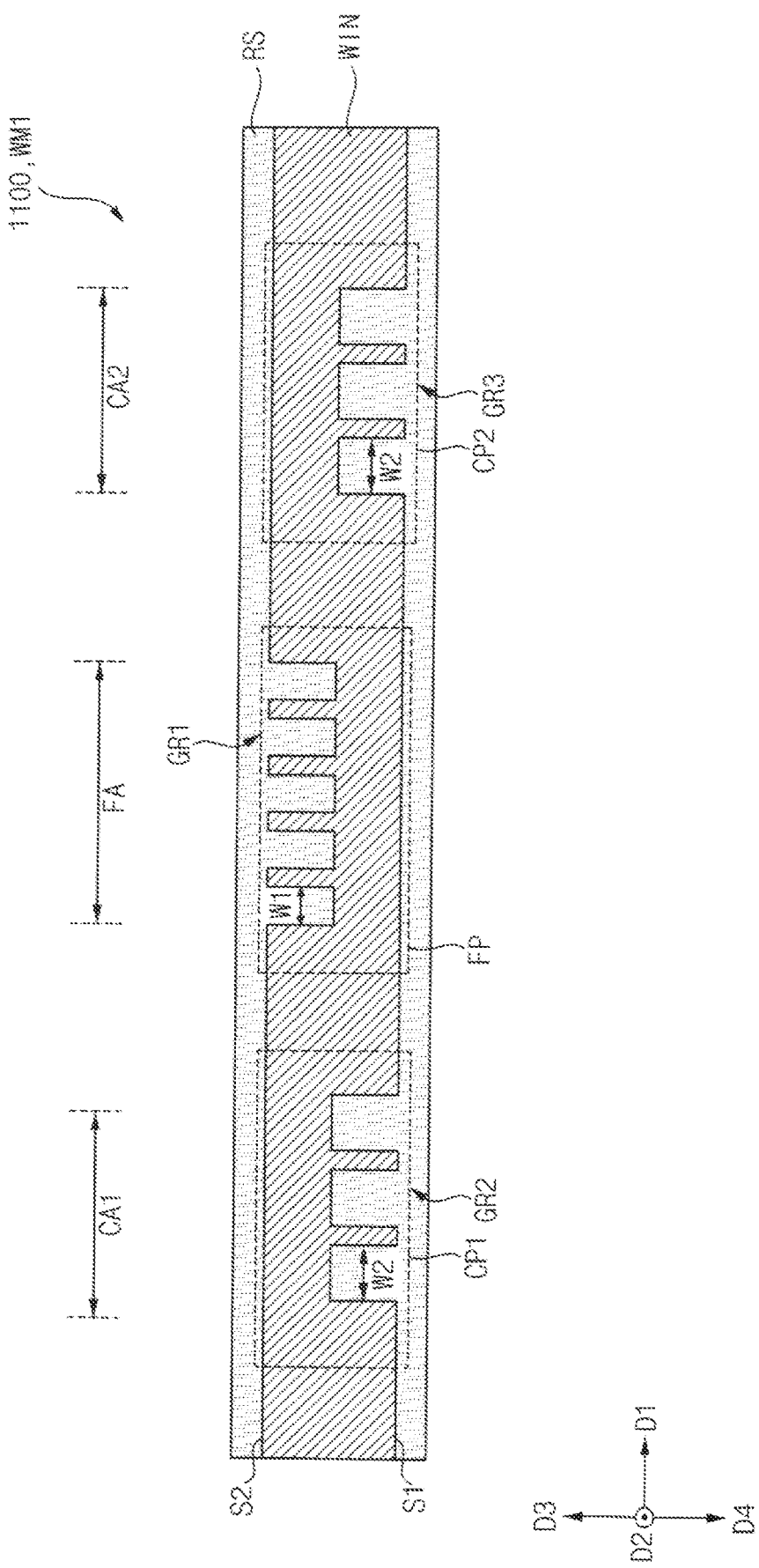
FIG. 7 is a cross-sectional view illustrating a window module included in a display device according to another embodiment of the inventive concept.

FIG. 7 is a cross-sectional view illustrating a window module included in a display device according to another embodiment of the inventive concept.

Referring to FIG. 7, a display device 1100 according to another embodiment of the inventive concept may include a window module WM1. However, the display device 1100 may be substantially the same as the display device 1000 described with reference to FIGS. 1 to 6, except for the window module WM1.

In an embodiment of the inventive concept, the window module WM1 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed by etching the window WIN at regular intervals. The first grooves GR1 may be formed in the second surface S2 and may extend in the fourth direction D4. Accordingly, a concave-convex shape may be formed in the second surface S2 of the window WIN. In contrast to FIG. 5, the first grooves GR1 of the window module WM1 are not formed on the first surface S1.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed by etching the window WIN at regular intervals. The second grooves GR2 may be formed in the first surface S1 and may extend in the third direction D3. Accordingly, a concave-convex shape may be formed in the first surface S1 of the window WIN. In contrast to FIG. 5, the second grooves GR2 of the window module WM1 are not formed on the second surface S2.

In an embodiment of the inventive concept, the second curved portion CP2 may overlap the second curved area CA2. As the folding portion FP is folded, a curvature may be formed in the second curved part CP2. Third grooves GR3 may be formed in the second curved portion CP2. In other words, the third grooves GR3 may overlap the second curved area CA2.

In an embodiment of the inventive concept, the third grooves GR3 may be formed by etching the window WIN at regular intervals. The third grooves GR3 may be formed in the first surface S1 and may extend in the third direction D3. Accordingly, a concave-convex shape may be formed in the first surface S1 of the window WIN. In contrast to FIG. 5, the third grooves GR3 of the window module WM1 are not formed on the second surface S2.

In an embodiment of the inventive concept, the shape of the first curved part CP1 may be substantially the same as the shape of the second curved part CP2.

In an embodiment of the inventive concept, a first width W1 of each of the first grooves GR1 may be smaller than a second width W2 of each of the second grooves GR2. In addition, the second width W2 of each of the second grooves GR2 may be the same as a width of each of the third grooves GR3.

Figure 8:
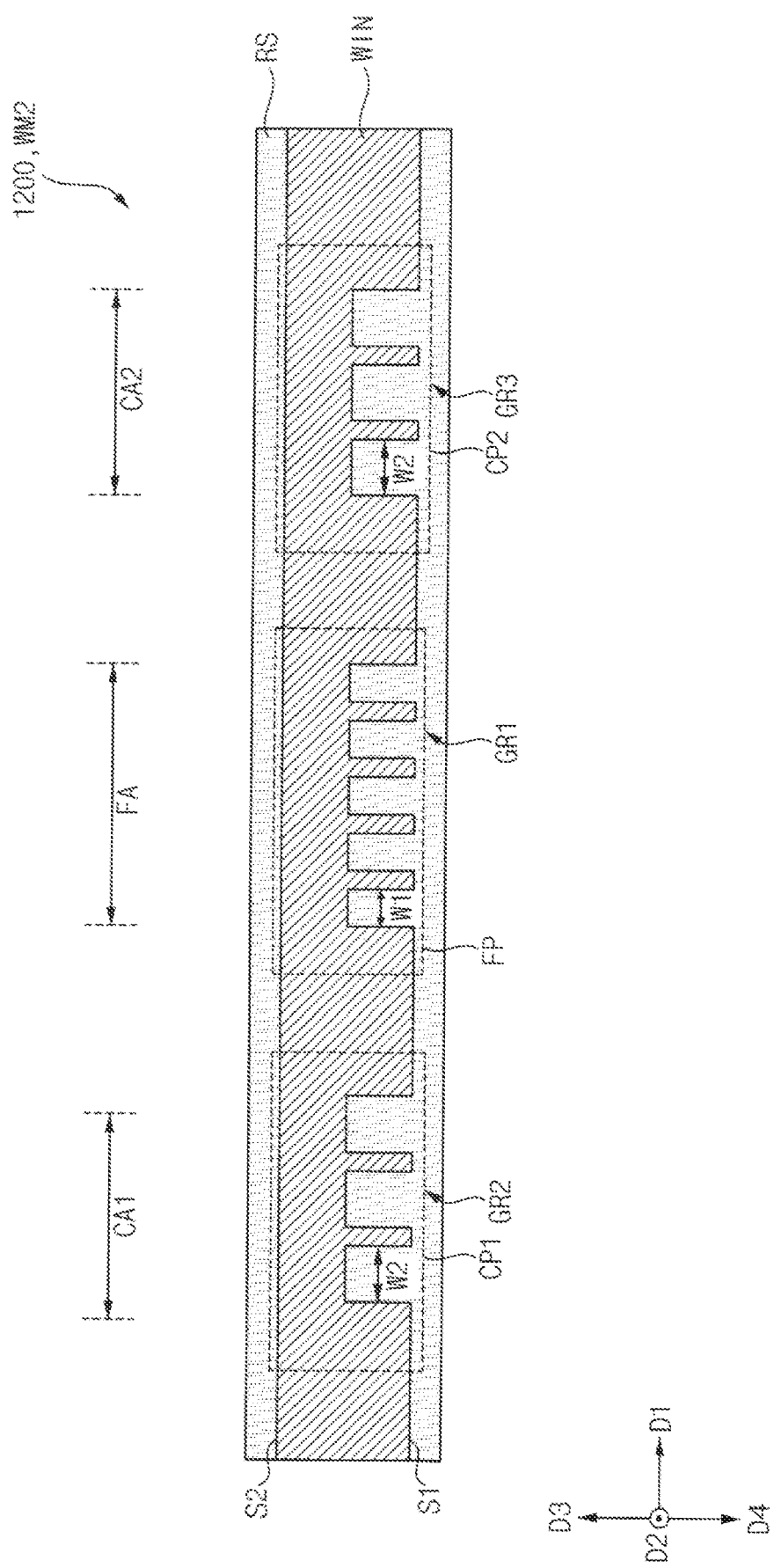
FIG. 8 is a cross-sectional view illustrating a window module included in a display device according to still another embodiment of the inventive concept.

FIG. 8 is a cross-sectional view illustrating a window module included in a display device according to still another embodiment of the inventive concept.

Referring to FIG. 8, a display device 1200 according to still another embodiment of the inventive concept may include a window module WM2. However, the display device 1200 may be substantially the same as the display device 1000 described with reference to FIGS. 1 to 6, except for the window module WM2.

In an embodiment of the inventive concept, the window module WM2 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding part FP. In other words, the first grooves GR1 may overlap the folding area FA.

In an embodiment of the inventive concept, the first grooves GR1 may be formed by etching the window WIN at regular intervals. The first grooves GR1 may be formed in the first surface S1 and may extend in the third direction D3. Accordingly, a concave-convex shape may be formed in the first surface S1 of the window WIN.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed by etching the window WIN at regular intervals. The second grooves GR2 may be formed in the first surface S1 and may extend in the third direction D3. Accordingly, a concave-convex shape may be formed on the first surface S1 of the window WIN.

In an embodiment of the inventive concept, the second curved portion CP2 may overlap the second curved area CA2. As the folding portion FP is folded, a curvature may be formed in the second curved portion CP2. Third grooves GR3 may be formed in the second curved portion CP2. In other words, the third grooves GR3 may overlap the second curved area CA2.

In an embodiment of the inventive concept, the third grooves GR3 may be formed by etching the window WIN at regular intervals. The third grooves GR3 may be formed in the first surface S1 and may extend in the third direction D3. Accordingly, a concave-convex shape may be formed in the first surface S1 of the window WIN. In FIG. 8, the first, second and third grooves GR1-GR3 may be formed on the same surface of the window WIN.

In an embodiment of the inventive concept, the shape of the first curved portion CP1 may be substantially the same as the shape of the second curved portion CP2.

In an embodiment of the inventive concept, a first width W1 of each of the first grooves GR1 may be smaller than a second width W2 of each of the second grooves GR2. In addition, the second width W2 of each of the second grooves GR2 may be the same as a width of each of the third grooves GR3.

Figure 9:
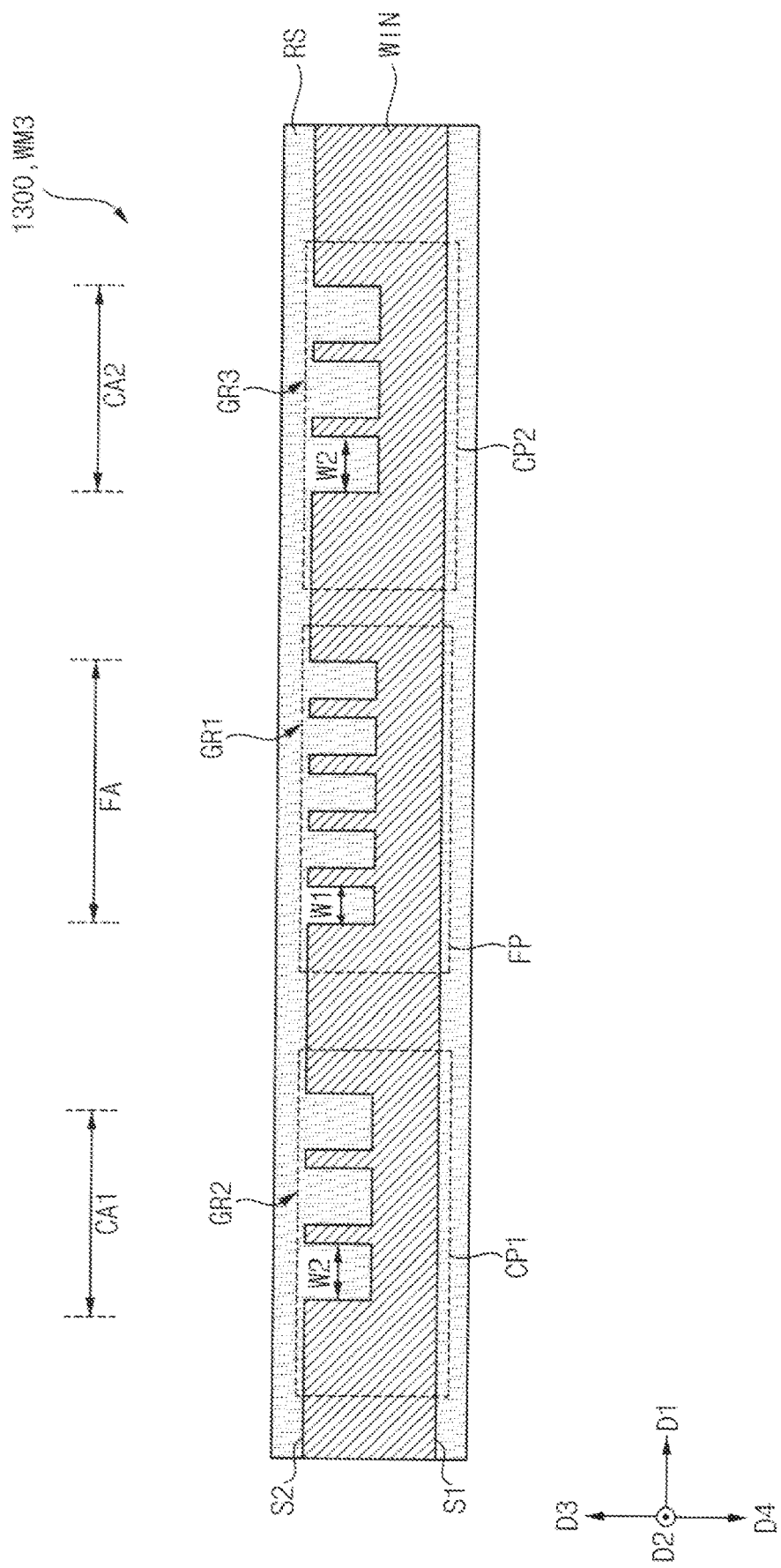
FIG. 9 is a cross-sectional view illustrating a window module included in a display device according to still another embodiment of the inventive concept.

FIG. 9 is a cross-sectional view illustrating a window module included in a display device according to still another embodiment of the inventive concept.

Referring to FIG. 9, a display device 1300 according to still another embodiment of the inventive concept may include a window module WM3. However, the display device 1300 may be substantially the same as the display device 1000 described with reference to FIGS. 1 to 6, except for the window module WM3.

In an embodiment of the inventive concept, the window module WM3 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed by etching the window WIN at regular intervals. The first grooves GR1 may be formed in the second surface S2 and may extend in the fourth direction D4. Accordingly, a concave-convex shape may be formed in the second surface S2 of the window WIN.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed by etching the window WIN at regular intervals. The second grooves GR2 may be formed in the second surface S2 and may extend in the fourth direction D4. Accordingly, a concave-convex shape may be formed in the second surface S2 of the window WIN.

In an embodiment of the inventive concept, the second curved portion CP2 may overlap the second curved area CA2. As the folding portion FP is folded, a curvature may be formed in the second curved portion CP2. Third grooves GR3 may be formed in the second curved portion CP2. In other words, the third grooves GR3 may overlap the second curved area CA2.

In an embodiment of the inventive concept, the third grooves GR3 may be formed by etching the window WIN at regular intervals. The third grooves GR3 may be formed in the second surface S2 and may extend in the fourth direction D4. Accordingly, a concave-convex shape may be formed in the second surface S2 of the window WIN. In FIG. 9, the first, second and third grooves GR1-GR3 may be formed on the same surface of the window WIN.

In an embodiment of the inventive concept, the shape of the first curved part CP1 may be substantially the same as the shape of the second curved part CP2.

In an embodiment of the inventive concept, a first width W1 of each of the first grooves GR1 may be smaller than a second width W2 of each of the second grooves GR2. In addition, the second width W2 of each of the second grooves GR2 may be the same as a width of each of the third grooves GR3.

Figure 10:
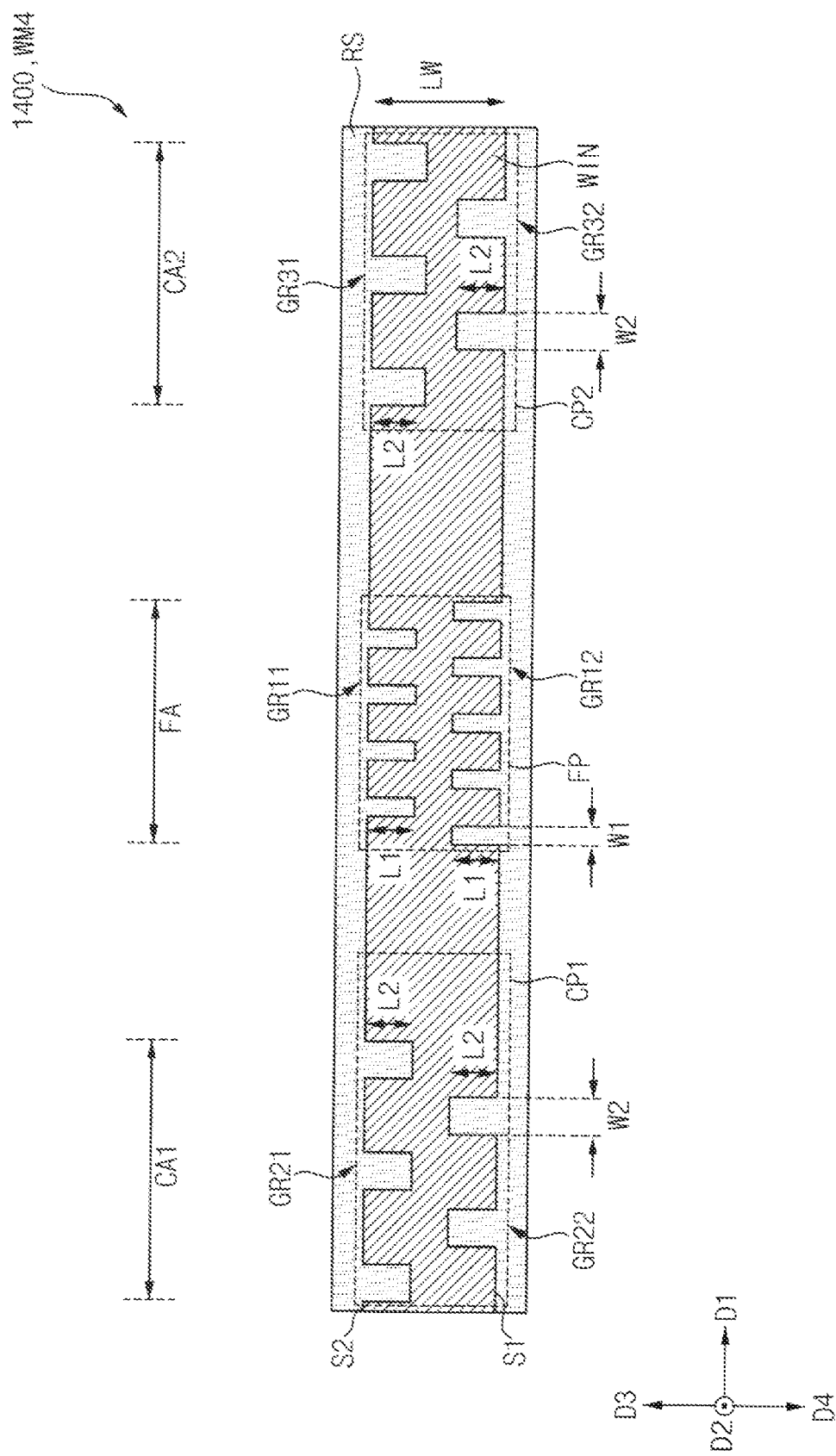
FIG. 10 is a cross-sectional view illustrating a window module included in a display device according to still another embodiment of the inventive concept.

FIG. 10 is a cross-sectional view illustrating a window module included in a display device according to still another embodiment of the inventive concept.

Referring to FIG. 10, a display device 1400 according to still another embodiment of the inventive concept may include a window module WM4. However, the display device 1400 may be substantially the same as the display device 1000 described with reference to FIGS. 1 to 6, except for the window module WM4.

In an embodiment of the inventive concept, the window module WM4 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First folding grooves GR11 and second folding grooves GR12 may be formed in the folding portion FP. In other words, the first folding grooves GR11 and the second folding grooves GR12 may overlap the folding area FA.

In an embodiment of the inventive concept, the first folding grooves GR11 may be formed by etching the window WIN at regular intervals. The first folding grooves GR11 may be formed in the second surface S2 and may extend in the fourth direction D4. Accordingly, a concave-convex shape may be formed in the second surface S2 of the window WIN.

In an embodiment of the inventive concept, the second folding grooves GR12 may be formed by etching the window WIN at regular intervals. The second folding grooves GR12 may be formed in the first surface S1 and may extend in the third direction D3. Accordingly, a concave-convex shape may be formed in the first surface S1 of the window WIN.

In an embodiment of the inventive concept, the second folding grooves GR12 may be defined between the first folding grooves GR11. For example, the first folding grooves GR11 and the second folding grooves GR12 may cross each other. In other words, the first folding grooves GR11 and the second folding grooves GR12 may not overlap each other in the third direction D3.

In an embodiment of the inventive concept, a first depth L1 of each of the first folding grooves GR11 may be smaller than a half of a thickness LW of the window WIN. In addition, each of the second folding grooves GR12 may have the same depth as the first depth L1. Accordingly, when viewed in the longitudinal direction of the window WIN (e.g., in the first direction D1), the first folding grooves GR11 and the second folding grooves GR12 may be spaced apart from each other.

In the display device 1400, since the first and second folding grooves GR11 and GR12 are formed in opposite surfaces of each other, stress applied to the folding portion FP may be dispersed.

In an embodiment of the inventive concept, the first curved portion CP1 may overlap the first curved area CA1. As the folding portion FP is folded, a curvature may be formed in the first curved portion CP1. First curved grooves GR21 and second curved grooves GR22 may be formed in the first curved portion CP1. In other words, the first curved grooves GR21 and the second curved grooves GR22 may overlap the first curved area CA1.

In an embodiment of the inventive concept, the first curved grooves GR21 may be formed by etching the window WIN at regular intervals. The first curved grooves GR21 may be formed in the second surface S2 and may extend in the fourth direction D4. Accordingly, a concave-convex shape may be formed in the second surface S2 of the window WIN.

In an embodiment of the inventive concept, the second curved grooves GR22 may be formed by etching the window WIN at regular intervals. The second curved grooves GR22 may be formed in the first surface S1 and may extend in the third direction D3. Accordingly, a concave-convex shape may be formed in the first surface S1 of the window WIN.

In an embodiment, the second curved grooves GR22 may be defined between the first curved grooves GR21. For example, the first curved grooves GR21 and the second curved grooves GR22 may cross each other. In other words, the first curved grooves GR12 and the second curved grooves GR22 may not overlap each other in the third direction D3.

In an embodiment of the inventive concept, a second depth L2 of each of the first curved grooves GR21 may be smaller than a half of the thickness LW of the window WIN. In addition, a depth of each of the second curved grooves GR22 may be the same as the second depth L2. Accordingly, when viewed in the longitudinal direction (e.g., in the first direction D1) of the window WIN, the first curved grooves GR21 and the second curved grooves GR22 may be spaced apart from each other.

In an embodiment of the inventive concept, the second curved portion CP2 may overlap the second curved area CA2. As the folding portion FP is folded, a curvature may be formed in the second curved portion CP2. Third curved grooves GR31 and fourth curved grooves GR32 may be formed in the second curved portion CP2. In other words, the third curved grooves GR31 and the fourth curved grooves GR32 may overlap the second curved area CA2.

In an embodiment of the inventive concept, the shape of the first curved part CP1 may be substantially the same as the shape of the second curved part CP2. For example, the fourth curved grooves GR32 may be defined between the third curved grooves GR31.

In an embodiment of the inventive concept, a first width W1 of each of the first folding grooves GR11 may be smaller than a second width W2 of each of the first curved grooves GR21. In addition, the second width W2 of each of the first curved grooves GR21 may be the same as the width of each of the second curved grooves GR22, the width of each of the third curved grooves GR31, and the width of each of the fourth curved grooves GR32.

Figure 11:
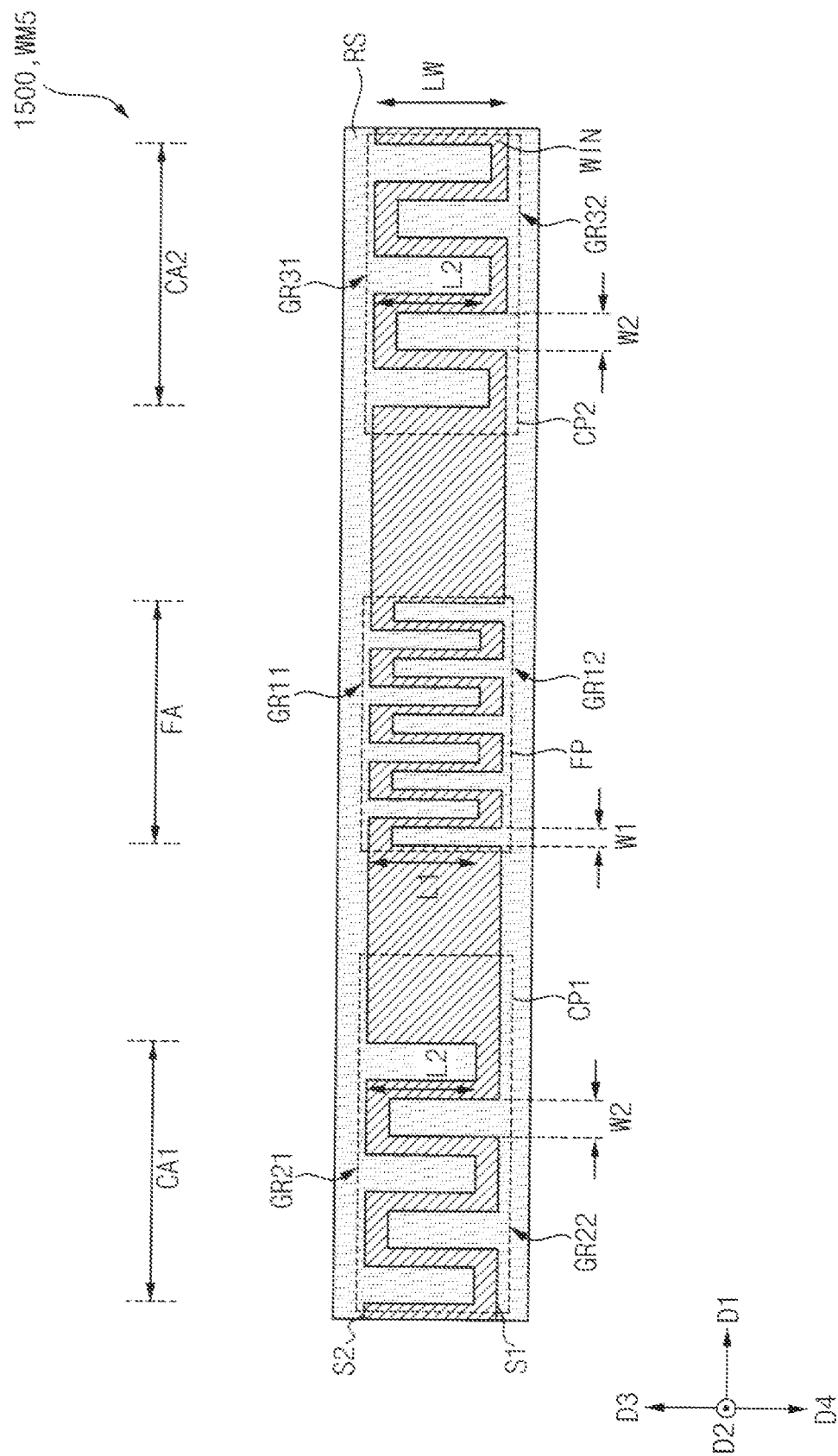
FIG. 11 is a cross-sectional view illustrating a window module included in a display device according to still another embodiment of the inventive concept.

FIG. 11 is a cross-sectional view illustrating a window module included in a display device according to still another embodiment of the inventive concept.

Referring to FIG. 11, a display device 1500 according to still another embodiment of the inventive concept may include a window module WM5. However, the display device 1500 may be substantially the same as the display device 1000 described with reference to FIGS. 1 to 6, except for the window module WM5.

In an embodiment of the inventive concept, the window module WM5 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First folding grooves GR11 and second folding grooves GR12 may be formed in the folding portion FP. In other words, the first folding grooves GR11 and the second folding grooves GR12 may overlap the folding area FA.

In an embodiment of the inventive concept, the first folding grooves GR11 may be formed by etching the window WIN at regular intervals. The first folding grooves GR11 may be formed in the second surface S2 and may extend in the fourth direction D4. Accordingly, a concave-convex shape may be formed in the second surface S2 of the window WIN.

In an embodiment of the inventive concept, the second folding grooves GR12 may be formed by etching the window WIN at regular intervals. The second folding grooves GR12 may be formed in the first surface S1 and may extend in the third direction D3. Accordingly, a concave-convex shape may be formed in the first surface S1 of the window WIN.

In an embodiment of the inventive concept, the second folding grooves GR12 may be defined between the first folding grooves GR11. For example, the first folding grooves GR11 and the second folding grooves GR12 may cross each other.

In an embodiment of the inventive concept, a first depth L1 of each of the first folding grooves GR11 may be greater than a half of the thickness LW of the window WIN. In addition, each of the second folding grooves GR12 may have the same depth as the first depth L1. Accordingly, when viewed in the longitudinal direction (e.g., in the first direction D1) of the window WIN, the first folding grooves GR11 and the second folding grooves GR12 may overlap each other.

In the display device 1500, since the first and second folding grooves GR11 and GR12 are formed in opposite surfaces of each other, stress applied to the folding portion FP may be dispersed.

In an embodiment of the inventive concept, the first curved portion CP1 may overlap the first curved area CA1. As the folding portion FP is folded, a curvature may be formed in the first curved portion CP1. First curved grooves GR21 and second curved grooves GR22 may be formed in the first curved portion CP1. In other words, the first curved grooves GR21 and the second curved grooves GR22 may overlap the first curved area CA1.

In an embodiment of the inventive concept, the first curved grooves GR21 may be formed by etching the window WIN at regular intervals. The first curved grooves GR21 may be formed in the second surface S2 and may extend in the fourth direction D4. Accordingly, a concave-convex shape may be formed in the second surface S2 of the window WIN.

In an embodiment of the inventive concept, the second curved grooves GR22 may be formed by etching the window WIN at regular intervals. The second curved grooves GR22 may be formed in the first surface S1 and may extend in the third direction D3. Accordingly, a concave-convex shape may be formed in the first surface S1 of the window WIN.

In an embodiment of the inventive concept, the second curved grooves GR22 may be defined between the first curved grooves GR21. For example, the first curved grooves GR21 and the second curved grooves GR22 may cross each other.

In an embodiment of the inventive concept, a second depth L2 of each of the first curved grooves GR21 may be greater than a half the thickness LW of the window WIN. The second depth L2 may be the same as or different from the first depth L1. In addition, a depth of each of the second curved grooves GR22 may be the same as the second depth L2. Accordingly, when viewed in the longitudinal direction (e.g., the first direction D1) of the window WIN, the first curved grooves GR21 and the second curved grooves GR22 may overlap each other.

In an embodiment of the inventive concept, the second curved portion CP2 may overlap the second curved area CA2. As the folding portion FP is folded, a curvature may be formed in the second curved portion CP2. Third curved grooves GR31 and fourth curved grooves GR32 may be formed in the second curved portion CP2. In other words, the third curved grooves GR31 and the fourth curved grooves GR32 may overlap the second curved area CA2.

In an embodiment of the inventive concept, the shape of the first curved part CP1 may be substantially the same as the shape of the second curved part CP2.

In an embodiment of the inventive concept, a first width W1 of each of the first folding grooves GR11 may be smaller than a second width W2 of each of the first curved grooves GR21. In addition, the second width W2 of each of the first curved grooves GR21 may be the same as a width of each of the second curved grooves GR22, a width of each of the third curved grooves GR31, and a width of each of the fourth curved grooves GR32.

Figure 12:
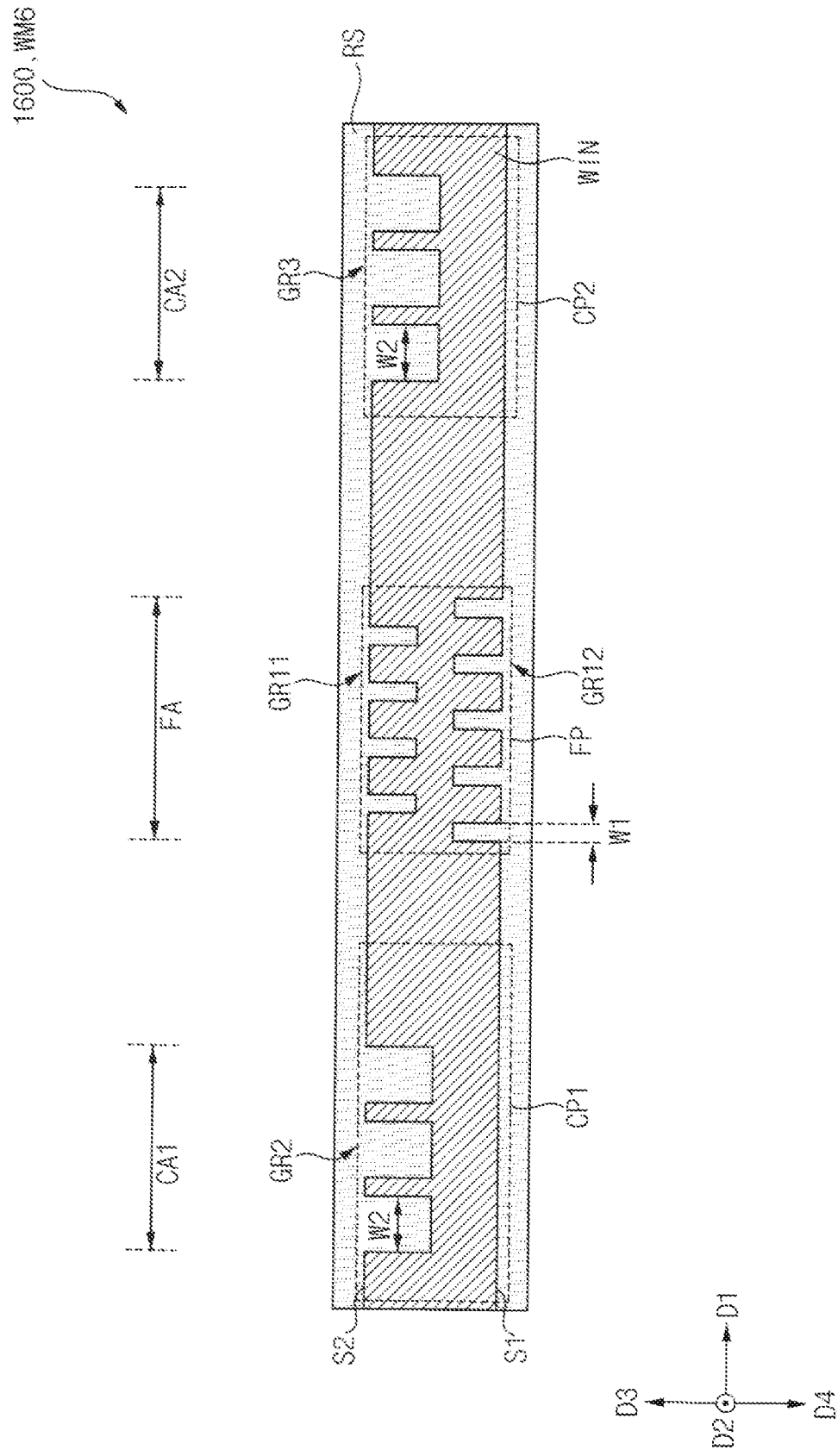
FIG. 12 is a cross-sectional view illustrating a window module included in a display device according to still another embodiment of the inventive concept.

FIG. 12 is a cross-sectional view illustrating a window module included in a display device according to still another embodiment of the inventive concept.

Referring to FIG. 12, a display device 1600 according to still another embodiment of the inventive concept may include a window module WM6. However, the display device 1600 may be substantially the same as the display device 1000 described with reference to FIGS. 1 to 6, except for the window module WM6.

In an embodiment of the inventive concept, the window module WM6 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First folding grooves GR11 and second folding grooves GR12 may be formed in the folding portion FP. In other words, the first folding grooves GR11 and the second folding grooves GR12 may overlap the folding area FA.

In an embodiment of the inventive concept, the first folding grooves GR11 may be formed by etching the window WIN at regular intervals. The first folding grooves GR11 may be formed in the second surface S2 and may extend in the fourth direction D4. Accordingly, a concave-convex shape may be formed in the second surface S2 of the window WIN.

In an embodiment of the inventive concept, the second folding grooves GR12 may be formed by etching the window WIN at regular intervals. The second folding grooves GR12 may be formed in the first surface S1 and may extend in the third direction D3. Accordingly, a concave-convex shape may be formed in the first surface S1 of the window WIN.

In an embodiment of the inventive concept, the second folding grooves GR12 may be defined between the first folding grooves GR11. For example, the first folding grooves GR11 and the second folding grooves GR12 may cross each other. It is to be understood that although the second folding grooves GR12 are disposed between the first folding grooves GR11 in this embodiment and others, at least one of the second folding groove GR12 may overlap at least one of the first folding grooves GR11.

In the display device 1600, since the first and second folding grooves GR11 and GR12 are formed in opposite surfaces of each other, stress applied to the folding portion FP may be dispersed.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed by etching the window WIN at regular intervals. The second grooves GR2 may be formed in the second surface S2 and may extend in the fourth direction D4. Accordingly, a concave-convex shape may be formed in the second surface S2 of the window WIN.

In an embodiment of the inventive concept, the second curved portion CP2 may overlap the second curved area CA2. As the folding portion FP is folded, a curvature may be formed in the second curved portion CP2. Third grooves GR3 may be formed in the second curved portion CP2. In other words, the third grooves GR3 may overlap the second curved area CA2.

In an embodiment of the inventive concept, the third grooves GR3 may be formed by etching the window WIN at regular intervals. The third grooves GR3 may be formed in the second surface S2 and may extend in the fourth direction D4. Accordingly, a concave-convex shape may be formed in the second surface S2 of the window WIN.

In an embodiment of the inventive concept, the shape of the first curved part CP1 may be substantially the same as the shape of the second curved part CP2.

In an embodiment of the inventive concept, a first width W1 of each of the first folding grooves GR11 may be smaller than a second width W2 of each of the second grooves GR2. In addition, the second width W2 of each of the second grooves GR2 may be the same as a width of each of the third grooves GR3.

Figure 13:
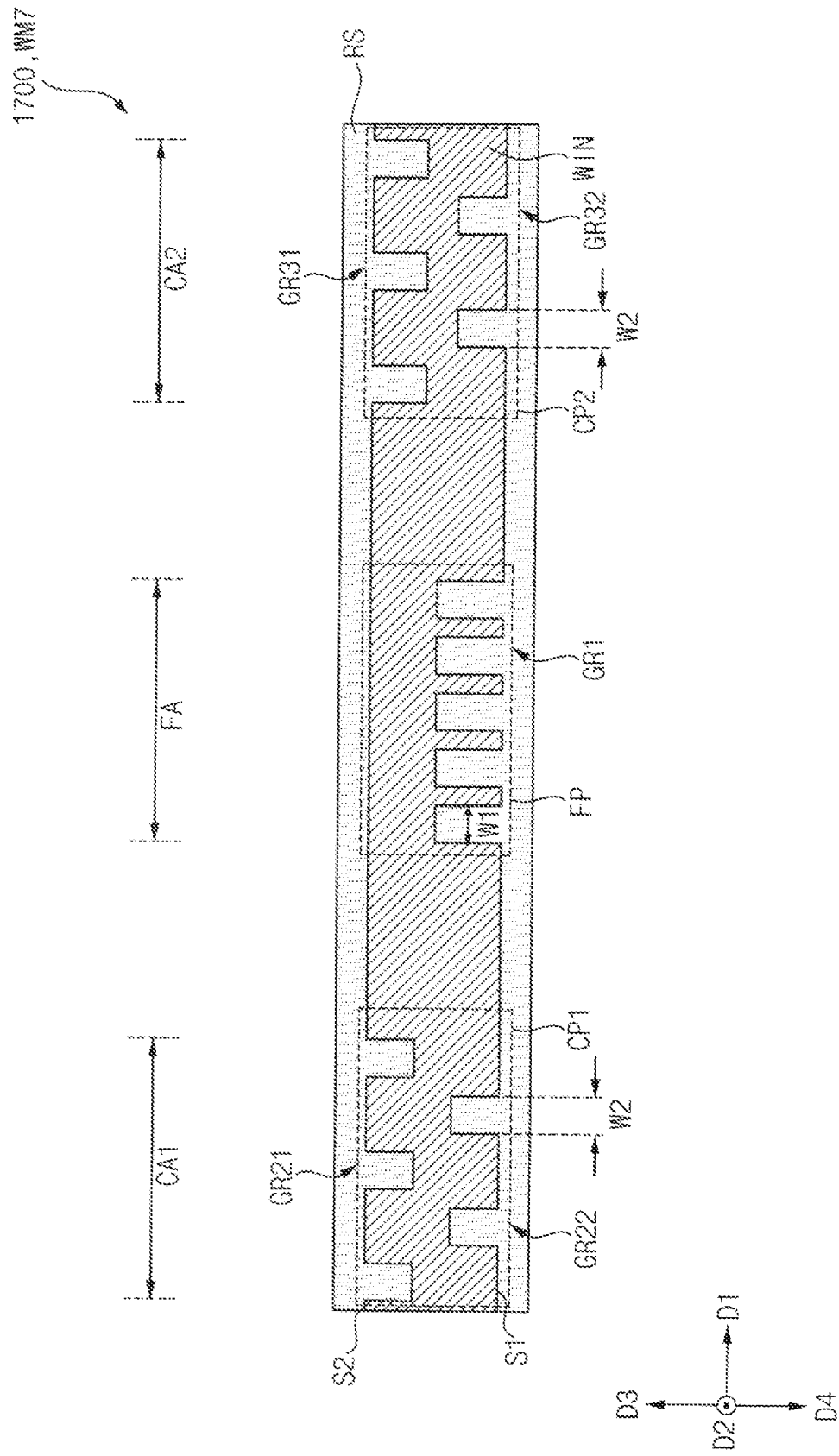
FIG. 13 is a cross-sectional view illustrating a window module included in a display device according to still another embodiment of the inventive concept.

FIG. 13 is a cross-sectional view illustrating a window module included in a display device according to still another embodiment of the inventive concept.

Referring to FIG. 13, a display device 1700 according to still another embodiment of the inventive concept may include a window module WM7. However, the display device 1700 may be substantially the same as the display device 1000 described with reference to FIGS. 1 to 6, except for the window module WM7.

In an embodiment of the inventive concept, the window module WM7 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed by etching the window WIN at regular intervals. The first grooves GR1 may be formed in the first surface S1 and may extend in the third direction D3. Accordingly, a concave-convex shape may be formed in the first surface S1 of the window WIN.

In an embodiment of the inventive concept, the first curved portion CP1 may overlap the first curved area CA1. As the folding portion FP is folded, a curvature may be formed in the first curved portion CP1. First curved grooves GR21 and second curved grooves GR22 may be formed in the first curved portion CP1. In other words, the first curved grooves GR21 and the second curved grooves GR22 may overlap the first curved area CA1.

In an embodiment of the inventive concept, the first curved grooves GR21 may be formed by etching the window WIN at regular intervals. The first curved grooves GR21 may be formed in the second surface S2 and may extend in the fourth direction D4. Accordingly, a concave-convex shape may be formed in the second surface S2 of the window WIN.

In an embodiment of the inventive concept, the second curved grooves GR22 may be formed by etching the window WIN at regular intervals. The second curved grooves GR22 may be formed in the first surface S1 and may extend in the third direction D3. Accordingly, a concave-convex shape may be formed in the first surface S1 of the window WIN.

In an embodiment of the inventive concept, the second curved grooves GR22 may be defined between the first curved grooves GR21. For example, the first curved grooves GR21 and the second curved grooves GR22 may cross each other.

In an embodiment of the inventive concept, a depth of each of the first curved grooves GR21 may be smaller than a half the thickness of the window WIN. In addition, a depth of each of the second curved grooves GR22 may be the same as the depth of each of the first curved grooves GR21. Accordingly, when viewed in the longitudinal direction (e.g., in the first direction D1) of the window WIN, the first curved grooves GR21 and the second curved grooves GR22 may be spaced apart from each other.

In an embodiment of the inventive concept, the second curved portion CP2 may overlap the second curved area CA2. As the folding portion FP is folded, a curvature may be formed in the second curved portion CP2. Third curved grooves GR31 and fourth curved grooves GR32 may be formed in the second curved portion CP2. In other words, the third curved grooves GR31 and the fourth curved grooves GR32 may overlap the second curved area CA2.

In an embodiment of the inventive concept, the shape of the first curved part CP1 may be substantially the same as the shape of the second curved part CP2. For example, a depth of the third curved grooves GR31 may be the same as a depth of the fourth curved grooves GR32.

In an embodiment of the inventive concept, a first width W1 of each of the first grooves GR1 may be smaller than a second width W2 of each of the first curved grooves GR21. In addition, the second width W2 of each of the first curved grooves GR21 may be the same as a width of each of the second curved grooves GR22, a width of each of the third curved grooves GR31, and a width of each of the fourth curved grooves GR32.

Figure 14:
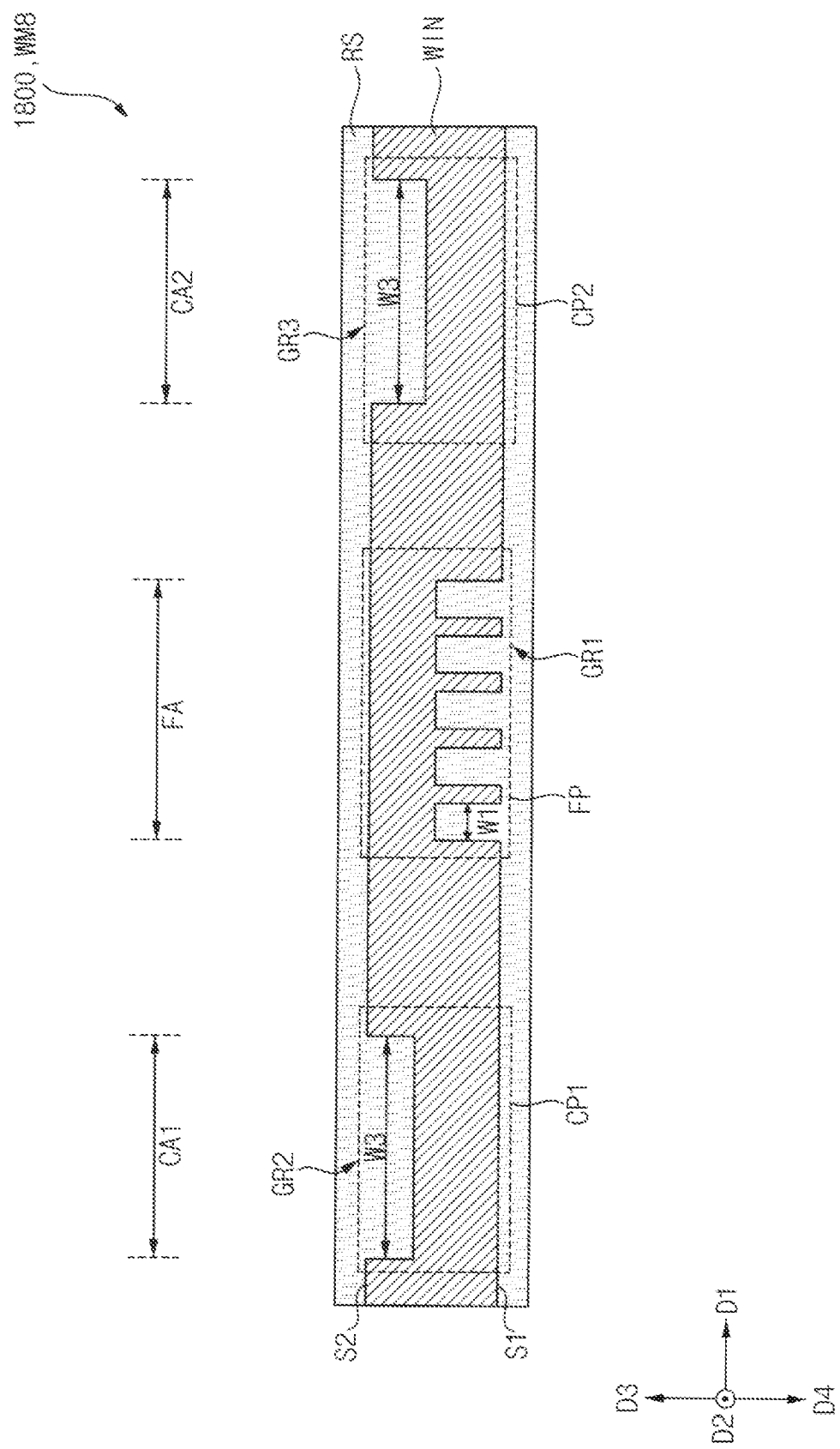
FIG. 14 is a cross-sectional view illustrating a window module included in a display device according to still another embodiment of the inventive concept.

FIG. 14 is a cross-sectional view illustrating a window module included in a display device according to still another embodiment of the inventive concept.

Referring to FIG. 14, a display device 1800 according to still another embodiment of the inventive concept may include a window module WM8. However, the display device 1800 may be substantially the same as the display device 1000 described with reference to FIGS. 1 to 6, except for the window module WM8.

In an embodiment of the inventive concept, the window module WM8 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed by etching the window WIN at regular intervals. The first grooves GR1 may be formed in the first surface S1 and may extend in the third direction D3. Accordingly, a concave-convex shape may be formed in the first surface S1 of the window WIN.

In an embodiment of the inventive concept, the first curved portion CP1 may overlap the first curved area CA1. As the folding portion FP is folded, a curvature may be formed in the first curved portion CP1. A second groove GR2 may be formed in the first curved portion CP1. In other words, the second groove GR2 may overlap the first curved area CA1.

In an embodiment, the second groove GR2 may be formed by partially etching the window WIN. The second groove GR2 may be formed in the second surface S2 and may extend in the fourth direction D4. In addition, the second groove GR2 may be a single pattern. In other words, just one second groove GR2 may be formed in the first curved portion CP1. For example, a third width W3 of the second groove GR2 may be greater than the second width W2 of the second groove GR2 described with reference to FIG. 5.

In an embodiment of the inventive concept, the second curved portion CP2 may overlap the second curved area CA2. As the folding portion FP is folded, a curvature may be formed in the second curved portion CP2. A third groove GR3 may be formed in the second curved portion CP2. In other words, the third groove GR3 may overlap the second curved area CA2.

In an embodiment of the inventive concept, the third groove GR3 may be formed by partially etching the window WIN. The third groove GR3 may be formed in the second surface S2 and may extend in the fourth direction D4. In addition, the third groove GR3 may be a single pattern. In other words, just one third groove GR3 may be formed in the second curved portion CP2.

In an embodiment of the inventive concept, the shape of the first curved part CP1 may be substantially the same as the shape of the second curved part CP2.

In an embodiment of the inventive concept, a first width W1 of each of the first grooves GR1 may be smaller than the third width W3 of the second groove GR2. In addition, the third width W3 of the second groove GR2 may be the same as a width of the third groove GR3.

Figure 15:
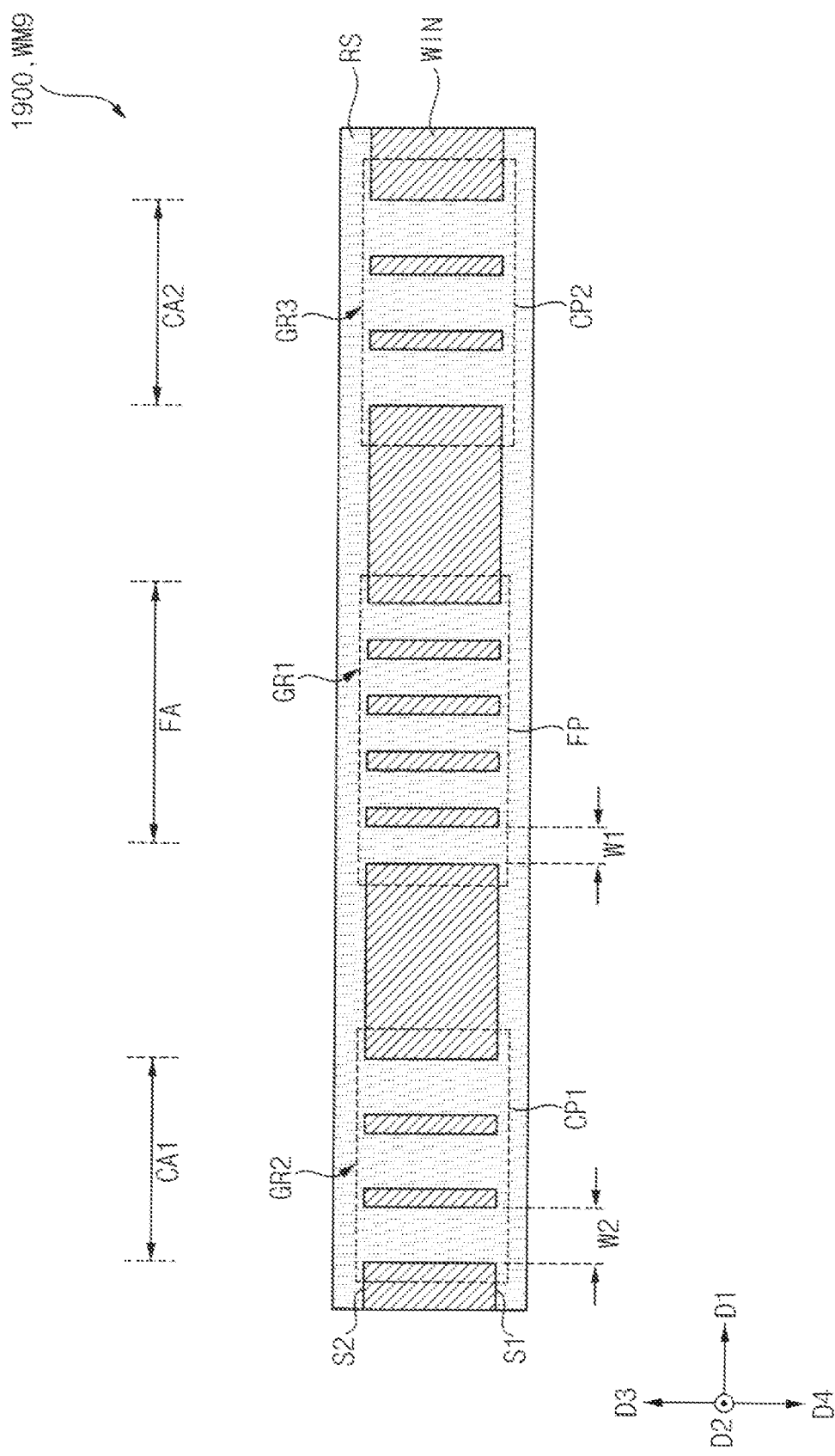
FIG. 15 is a cross-sectional view illustrating a window module included in a display device according to still another embodiment of the inventive concept.

FIG. 15 is a cross-sectional view illustrating a window module included in a display device according to still another embodiment of the inventive concept.

Referring to FIG. 15, a display device 1900 according to still another embodiment of the inventive concept may include a window module WM9. However, the display device 1900 may be substantially the same as the display device 1000 described with reference to FIGS. 1 to 6, except for the window module WM9.

In an embodiment of the inventive concept, the window module WM9 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed to penetrate the window WIN at regular intervals. The first grooves GR1 may extend from the first surface S1 to the second surface S2. Accordingly, the window WIN may be penetrated by the first grooves GR1. The resin RS may be filled in the window WIN penetrated by the first grooves GR1.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed to pass through the window WIN at regular intervals. The second grooves GR2 may extend from the first surface S1 to the second surface S2. Accordingly, the window WIN may be penetrated by the second grooves GR2. The resin RS may be filled in the window WIN penetrated by the second grooves GR2.

In an embodiment of the inventive concept, the second curved portion CP2 may overlap the second curved area CA2. As the folding portion FP is folded, a curvature may be formed in the second curved portion CP2. Third grooves GR3 may be formed in the second curved portion CP2. In other words, the third grooves GR3 may overlap the second curved area CA2.

In an embodiment of the inventive concept, the third grooves GR3 may be formed to penetrate the window WIN at regular intervals. The third grooves GR3 may extend from the first surface S1 to the second surface S2. Accordingly, the window WIN may be penetrated by the third grooves GR3. The resin RS may be filled in the window WIN penetrated by the third grooves GR3.

In an embodiment of the inventive concept, the shape of the first curved part CP1 may be substantially the same as the shape of the second curved part CP2.

In an embodiment of the inventive concept, the first width W1 of each of the first grooves GR1 may be smaller than the second width W2 of each of the second grooves GR2. In addition, the second width W2 of each of the second grooves GR2 may be the same as a width of each of the third grooves GR3.

Figure 16:
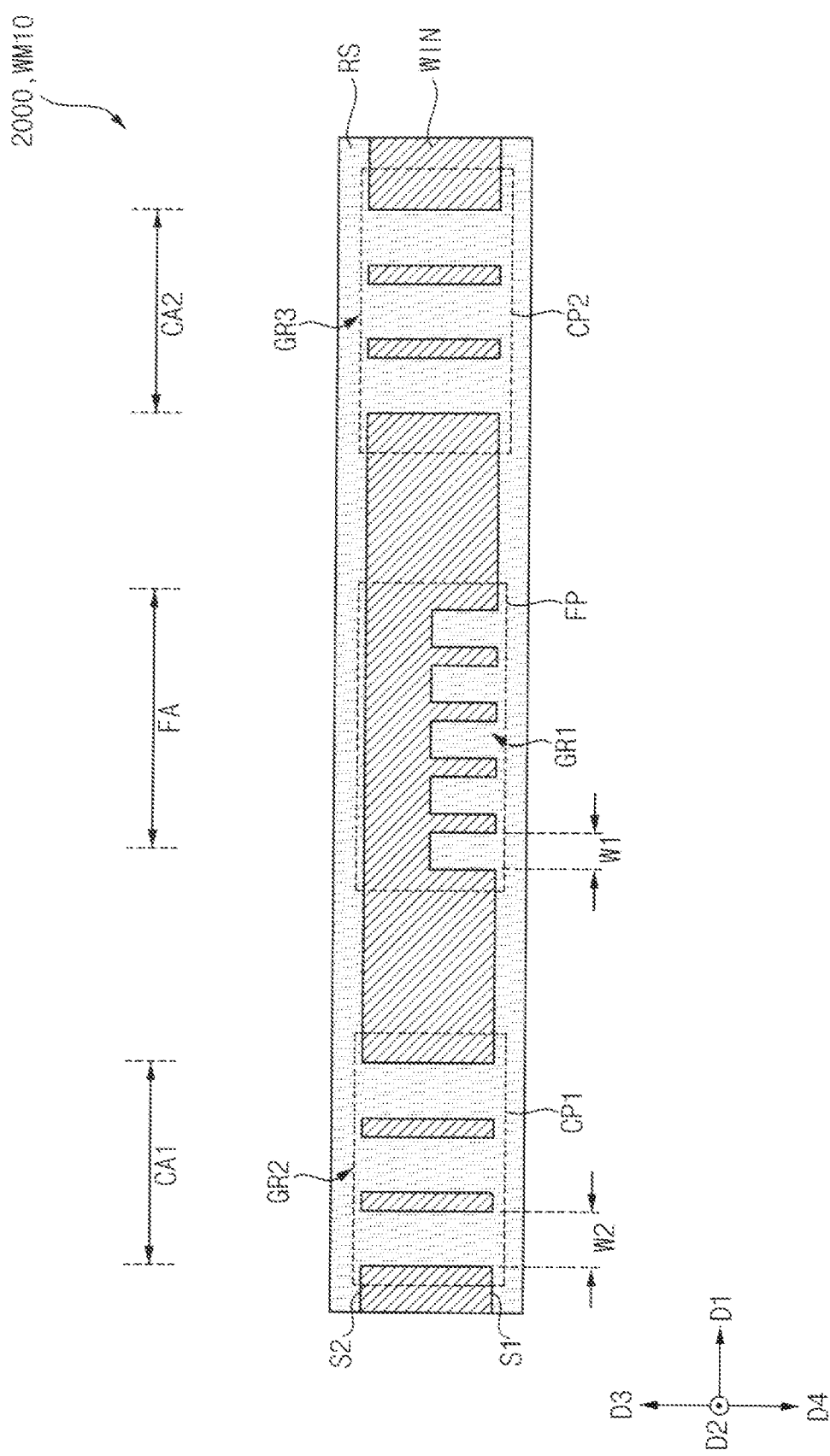
FIG. 16 is a cross-sectional view illustrating a window module included in a display device according to still another embodiment of the inventive concept.

FIG. 16 is a cross-sectional view illustrating a window module included in a display device according to still another embodiment of the inventive concept.

Referring to FIG. 16, the display device 2000 according to still another embodiment of the inventive concept may include a window module WM10. However, the display device 2000 may be substantially the same as the display device 1000 described with reference to FIGS. 1 to 6, except for the window module WM10.

In an embodiment of the inventive concept, the window module WM10 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed by etching the window WIN at regular intervals. The first grooves GR1 may be formed in the first surface S1 and may extend in the third direction D3. Accordingly, a concave-convex shape may be formed in the first surface S1 of the window WIN. The resin RS may be filled in the first grooves GR1 but not extend entirely through the window WIN like that shown in the first and second curved portions CP1 and CP2 and described below.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment of the inventive concept, the second grooves GR2 may be formed to pass through the window WIN at regular intervals. The second grooves GR2 may extend from the first surface S1 to the second surface S2. Accordingly, the window WIN may be penetrated by the second grooves GR2. The resin RS may be filled in the window WIN penetrated by the second grooves GR2.

In an embodiment of the inventive concept, the second curved portion CP2 may overlap the second curved area CA2. As the folding portion FP is folded, a curvature may be formed in the second curved portion CP2. Third grooves GR3 may be formed in the second curved portion CP2. In other words, the third grooves GR3 may overlap the second curved area CA2.

In an embodiment of the inventive concept, the third grooves GR3 may be formed to penetrate the window WIN at regular intervals. The third grooves GR3 may extend from the first surface S1 to the second surface S2. Accordingly, the window WIN may be penetrated by the third grooves GR3. The resin RS may be filled in the window WIN penetrated by the third grooves GR3.

In an embodiment, the shape of the first curved part CP1 may be substantially the same as the shape of the second curved part CP2.

In an embodiment, a first width W1 of each of the first grooves GR1 may be smaller than a second width W2 of each of the second grooves GR2. In addition, the second width W2 of each of the second grooves GR2 may be the same as a width of each of the third grooves GR3.

Figure 17:
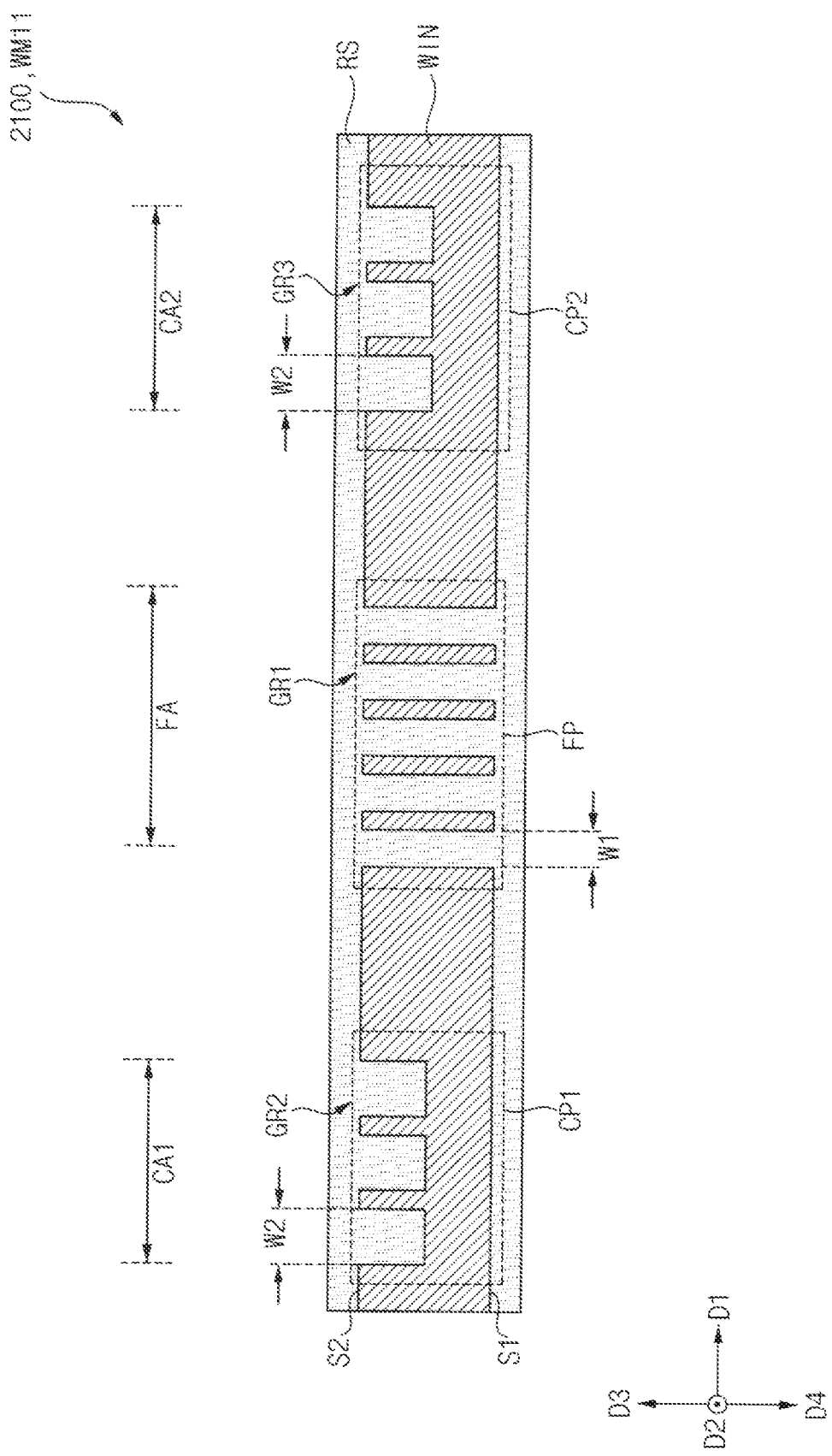
FIG. 17 is a cross-sectional view illustrating a window module included in a display device according to still another embodiment of the inventive concept.

FIG. 17 is a cross-sectional view illustrating a window module included in a display device according to still another embodiment of the inventive concept.

Referring to FIG. 17, a display device 2100 according to still another embodiment may include a window module WM11. However, the display device 2100 may be substantially the same as the display device 1000 described with reference to FIGS. 1 to 6, except for the window module WM11.

In an embodiment of the inventive concept, the window module WM11 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed to penetrate the window WIN at regular intervals. The first grooves GR1 may extend from the first surface S1 to the second surface S2. Accordingly, the window WIN may be penetrated by the first grooves GR1. The resin RS may be filled in the window WIN penetrated by the first grooves GR1.

In an embodiment of the inventive concept, the first curved portion CP1 may overlap the first curved area CA1. As the folding portion FP is folded, a curvature may be formed in the first curved portion CP1. Second grooves GR2 may be formed in the first curved portion CP1. In other words, the second grooves GR2 may overlap the first curved area CA1.

In an embodiment, the second grooves GR2 may be formed by etching the window WIN at regular intervals. The second grooves GR2 may be formed in the second surface S2, and may be formed in a fourth direction D4 (e.g., a direction from the second surface S2 to the first surface S1) opposite to the third direction D3. Accordingly, a concave-convex shape may be formed in the second surface S2 of the window WIN. The resin RS may be filled in the second grooves GR2 but extend from the first surface S1 to the second surface S2 like the resin RS in the first grooves GR1.

In an embodiment of the inventive concept, the second curved portion CP2 may overlap the second curved area CA2. As the folding portion FP is folded, a curvature may be formed in the second curved part CP2. Third grooves GR3 may be formed in the second curved portion CP2. In other words, the third grooves GR3 may overlap the second curved area CA2.

In an embodiment of the inventive concept, the third grooves GR3 may be formed by etching the window WIN at regular intervals. The third grooves GR3 may be formed in the second surface S2 and may extend in the fourth direction D4. Accordingly, a concave-convex shape may be formed in the second surface S2 of the window WIN.

In an embodiment of the inventive concept, the shape of the first curved part CP1 may be substantially the same as the shape of the second curved part CP2.

In an embodiment of the inventive concept, a first width W1 of each of the first grooves GR1 may be smaller than a second width W2 of each of the second grooves GR2. In addition, the second width W2 of each of the second grooves GR2 may be the same as a width of each of the third grooves GR3.

Figure 18:
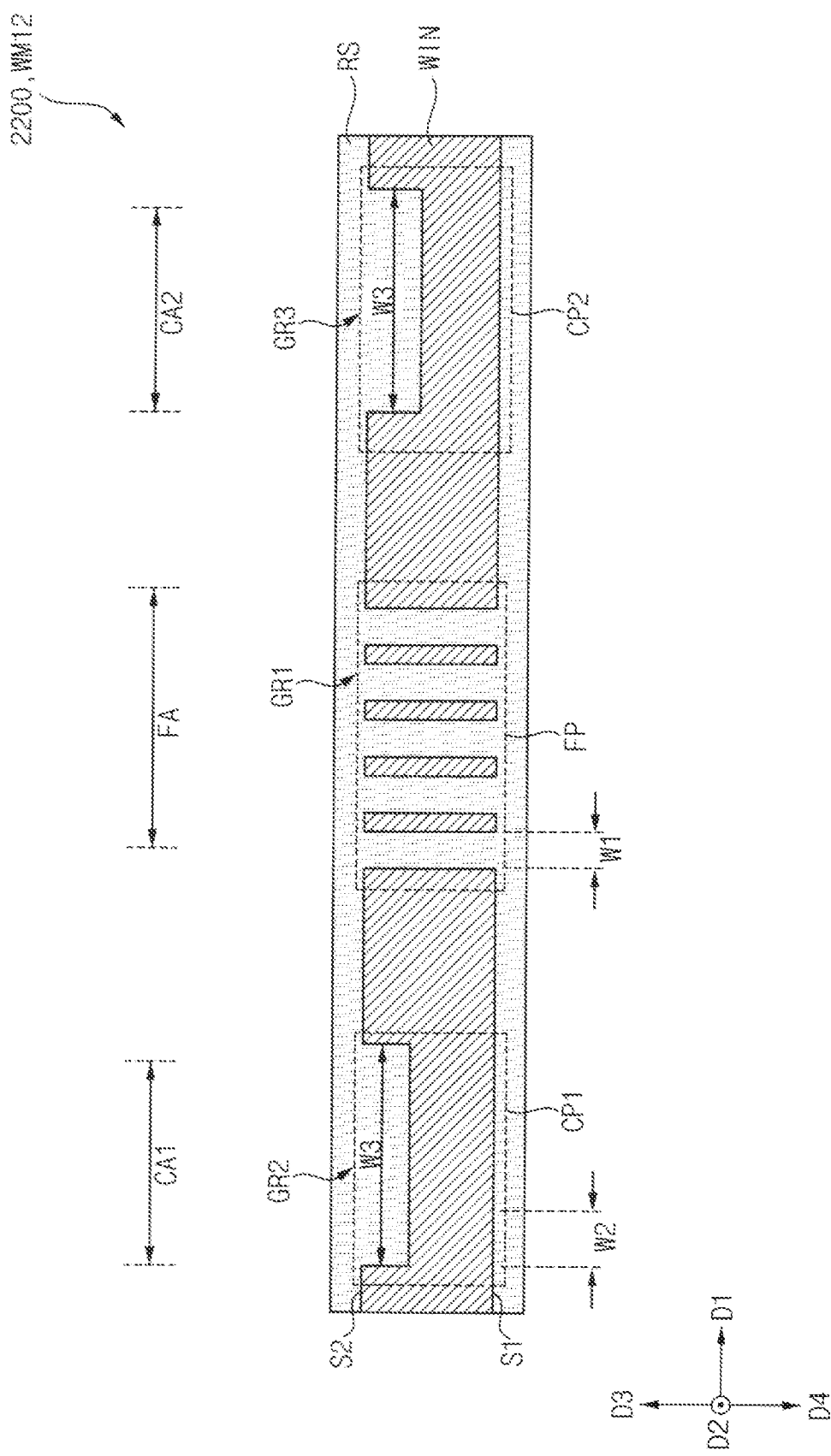
FIG. 18 is a cross-sectional view illustrating a window module included in a display device according to still another embodiment of the inventive concept.

FIG. 18 is a cross-sectional view illustrating a window module included in a display device according to still another embodiment of the inventive concept.

Referring to FIG. 18, a display device 2200 according to still another embodiment may include a window module WM12. However, the display device 2200 may be substantially the same as the display device 1000 described with reference to FIGS. 1 to 6, except for the window module WM12.

In an embodiment of the inventive concept, the window module WM12 may include a window WIN and a resin RS. The window WIN may include a folding portion FP, a first curved portion CP1, and a second curved portion CP2.

In an embodiment of the inventive concept, the folding portion FP may overlap the folding area FA and may be folded. First grooves GR1 may be formed in the folding portion FP. In other words, the first grooves GR1 may overlap the folding area FA.

In an embodiment of the inventive concept, the first grooves GR1 may be formed to penetrate the window WIN at regular intervals. The first grooves GR1 may extend from the first surface S1 to the second surface S2. Accordingly, the window WIN may be penetrated by the first grooves GR1. The resin RS may be filled in the window WIN penetrated by the first grooves GR1.

In an embodiment of the inventive concept, the first curved portion CP1 may overlap the first curved area CA1. As the folding portion FP is folded, a curvature may be formed in the first curved portion CP1. A second groove GR2 may be formed in the first curved portion CP1. In other words, the second groove GR2 may overlap the first curved area CA1.

In an embodiment of the inventive concept, the second groove GR2 may be formed by partially etching the window WIN. The second groove GR2 may be formed in the second surface S2 and may extend in the fourth direction D4. In addition, the second groove GR2 may be a single pattern. The second groove GR2 may be continuous. A third width W3 of the second groove GR2 may be greater than the second width W2 of the second groove GR2 described with reference to FIG. 5.

In an embodiment of the inventive concept, the second curved portion CP2 may overlap the second curved area CA2. As the folding portion FP is folded, a curvature may be formed in the second curved portion CP2. A third groove GR3 may be formed in the second curved portion CP2. In other words, the third groove GR3 may overlap the second curved area CA2.

In an embodiment of the inventive concept, the third groove GR3 may be formed by partially etching the window WIN. The third groove GR3 may be formed in the second surface S2 and may extend in the fourth direction D4. In addition, the third groove GR3 may be a single pattern. For example, the third groove GR3 may be continuous.

In an embodiment of the inventive concept, the shape of the first curved portion CP1 may be substantially the same as the shape of the second curved part CP2.

In an embodiment of the inventive concept, a first width W1 of each of the first grooves GR1 may be smaller than the third width W3 of the second groove GR2. In addition, the third width W3 of the second groove GR2 may be the same as a width of the third groove GR3.

It is to be understood that the window module of the inventive concept is not limited to the above. For example, the window module may be formed by selecting the folding portion, the first curved portion, and the second curved portion described with reference to FIGS. 5 and 7 to 18. For example, the window module may include the folding portion described with FIG. 7, the first curved portion described with FIG. 15, and the second curved portion described with FIG. 15. In addition, the window module may include the folding portion described with FIG. 7, the first curved portion described with FIG. 15, and the second curved portion described with FIG. 5.

Although certain embodiments and implementations of the inventive concept have been described herein, other embodiments and modifications will be apparent from this description. Accordingly, the inventive concept is not limited to the disclosed embodiments, but rather is intended to cover the scope of the appended claims and various modifications and equivalent arrangements as would be apparent to a person of ordinary skill in the art.

What is claimed is:

1. A display device, comprising:
   a display module including a display folding portion and a display curved portion adjacent to the display folding portion, wherein the display curved portion has a curvature when the display folding portion is folded; and
   a window disposed on the display module, the window including a first surface and a second surface opposite to the first surface, and having first grooves overlapping the display folding portion, second grooves overlapping the display curved portion and third grooves overlapping the display folding portion and facing the first grooves,
wherein the first grooves are formed in the first surface of the window and the second grooves are formed in the second surface of the window,
wherein a width of at least one of the first grooves is smaller than a width of at least one of the second grooves, and
wherein a width of at least one of the third grooves is smaller than a width of at least one of the second grooves.

2. The display device of claim 1, wherein the first surface of the window faces the display module.

3. The display device of claim 1, wherein the second surface of the window faces the display module.

4. The display device of claim 1, further comprising:
a support module disposed under the display module and having first holes overlapping the display folding portion and second holes overlapping the display curved portion.

5. The display device of claim 1, wherein a distance between the first grooves is smaller than a distance between the second grooves.

6. The display device of claim 1, further comprising:
a resin disposed in the first grooves and the second grooves and covering the window.

7. A display device, comprising:
a display module including a display folding portion, wherein the display folding portion is foldable; and
a window disposed on the display module, the window including a first surface facing the display module, a second surface opposite to the first surface, first folding grooves overlapping the display folding portion and second folding grooves overlapping the display folding portion,
wherein the first folding grooves are formed in the first surface of the window, and
wherein the second folding grooves are formed in the second surface of the window and between the first folding grooves,
wherein the display module further includes a display curved portion adjacent to the display folding portion, wherein the display curved portion has a curvature when the folding portion is folded,
wherein curved grooves overlapping the display curved portion are formed in the window,
wherein a width of at least one of the first folding grooves is smaller than a width of at least one of the curved grooves, and
wherein a width of at least one of the second folding grooves is smaller than the width of at least one of the curved grooves.

8. The display device of claim 7, wherein the first folding grooves and the second folding grooves do not overlap each other.

9. The display device of claim 7, wherein a depth of at least one of the first folding grooves is smaller than a half of a thickness of the window, and
wherein a depth of at least one of the second folding grooves is smaller than the half of the thickness of the window.

10. The display device of claim 9, wherein the first folding grooves and the second folding grooves are spaced apart from each other, when viewed in a longitudinal direction of the window.

11. The display device of claim 7, wherein a depth of at least one of the first folding grooves is greater than a half of a thickness of the window, and
wherein a depth of at least one of the second folding grooves is greater than the half of the thickness of the window.

12. The display device of claim 11, wherein the first folding grooves and the second folding grooves overlap each other, when viewed in a longitudinal direction of the window.

13. The display device of claim 7, wherein the curved grooves include:
first curved grooves formed in the first surface of the window; and
second curved grooves formed in the second surface of the widow and between the first curved grooves.

14. The display device of claim 7, wherein the curved grooves are formed in the second surface of the window.

15. The display device of claim 7, further comprising:
a resin in the first folding grooves and the second folding grooves and covering the window.

16. A display device, comprising:
a display module including a foldable portion and a curved portion adjacent to the foldable portion;
a window overlapping the display module, the window including a first recessed portion overlapping the foldable portion, a second recessed portion overlapping the curved portion and a third recessed portion overlapping the foldable portion and facing the first recessed portion; and
a resin provided in the first and second recessed portions,
wherein a width of each of the first recessed portion and the third recessed portion is smaller than a width of the second recessed portion.

17. The display device of claim 16, wherein the first recessed portion is formed in a first surface of the window and the second recessed portion is formed in a second surface of the window.

* * * * *